US011451271B2

(12) United States Patent
Lou et al.

(10) Patent No.: US 11,451,271 B2
(45) Date of Patent: Sep. 20, 2022

(54) METHODS AND APPARATUS FOR ENHANCED DYNAMIC ALLOCATION FOR DIRECTIONAL TRANSMISSION

(71) Applicant: INTERDIGITAL PATENT HOLDINGS, INC., Wilmington, DE (US)

(72) Inventors: Hanqing Lou, Syosset, NY (US); Li-Hsiang Sun, San Diego, CA (US); Oghenekome Oteri, San Diego, CA (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/347,075

(22) PCT Filed: Nov. 3, 2017

(86) PCT No.: PCT/US2017/059962
§ 371 (c)(1),
(2) Date: May 2, 2019

(87) PCT Pub. No.: WO2018/085677
PCT Pub. Date: May 11, 2018

(65) Prior Publication Data
US 2020/0067577 A1   Feb. 27, 2020

Related U.S. Application Data

(60) Provisional application No. 62/417,063, filed on Nov. 3, 2016.

(51) Int. Cl.
*H04W 4/00* (2018.01)
*H04B 7/0452* (2017.01)
(Continued)

(52) U.S. Cl.
CPC ......... *H04B 7/0452* (2013.01); *H04B 7/0617* (2013.01); *H04L 27/2601* (2013.01); *H04W 72/14* (2013.01); *H04W 84/12* (2013.01)

(58) Field of Classification Search
CPC .. H04B 7/0452; H04B 7/0617; H04B 7/0417; H04B 7/04; H04L 27/2601; H04W 72/14;
(Continued)

(56) References Cited

U.S. PATENT DOCUMENTS 8,867,478 B2    10/2014  Nayeb Nazar et al.
9,398,611 B2 *   7/2016  Choi ................. H04W 52/0216
(Continued)

FOREIGN PATENT DOCUMENTS

AU    2012247065 B2    4/2015
CA       2810413 C      9/2016
(Continued)

OTHER PUBLICATIONS

Agilent Technologies, "Wireless LAN and 60 GHz—IEEE 802.11ad Explained," pp. 1-28 (May 20, 2013).
(Continued)

*Primary Examiner* — Chuong T Ho
(74) *Attorney, Agent, or Firm* — Volpe Koenig

(57) ABSTRACT

Methods and apparatus are described herein for dynamic allocation of multiple channels and data streams for multi-channel transmission and multiple-input and multiple-output (MIMO). For example, a station (STA) may receive an enhanced poll (EPoll) frame that includes a time offset, a channel offset and antenna/sector settings from an access point (AP). The STA may transmit, based on the received EPoll frame, an enhanced service period request (ESPR) frame that includes a MIMO control field and a multi-channel control field. The MIMO control field may indicate whether the STA supports MIMO transmission. The multi-
(Continued)

channel control field may indicate whether the STA supports multi-channel transmission. Upon transmitting the ESPR frame, the STA may receive an enhanced grant frame from the AP. The enhanced grant frame may include an antenna configuration and a multi-channel allocation to enable the STA to perform the MIMO transmission and the multi-channel transmission.

20 Claims, 20 Drawing Sheets

(51) Int. Cl.
  *H04B 7/06* (2006.01)
  *H04L 27/26* (2006.01)
  *H04W 72/14* (2009.01)
  *H04W 84/12* (2009.01)
(58) Field of Classification Search
  CPC  H04W 84/12; H04W 74/002; H04W 72/1278
  USPC .................................................. 370/329, 330
  See application file for complete search history.

(56) References Cited

U.S. PATENT DOCUMENTS

| | | | |
|---|---|---|---|
| 9,872,206 B2 | 1/2018 | Cordeiro | |
| 10,461,827 B2* | 10/2019 | Sakoda | H04B 7/0491 |
| 10,506,513 B2* | 12/2019 | Park | H04W 52/0216 |
| 10,588,149 B2* | 3/2020 | Ahn | H04W 72/0453 |
| 2002/0122383 A1* | 9/2002 | Wu | H04L 1/0001 370/210 |
| 2011/0116487 A1 | 5/2011 | Grandhi | |
| 2012/0009880 A1 | 1/2012 | Trainin et al. | |
| 2012/0076228 A1* | 3/2012 | Wu | H04B 7/0413 375/267 |
| 2014/0064255 A1* | 3/2014 | Trainin | H04W 72/1278 370/336 |
| 2014/0362692 A1 | 12/2014 | Wu et al. | |
| 2015/0043482 A1 | 2/2015 | Choi et al. | |
| 2015/0289147 A1 | 10/2015 | Lou et al. | |
| 2016/0021680 A1* | 1/2016 | Choi | H04L 1/1614 370/311 |
| 2017/0048048 A1* | 2/2017 | Seok | H04L 1/1896 |
| 2017/0077979 A1* | 3/2017 | Papa | H04B 1/40 |
| 2017/0111099 A1* | 4/2017 | Jo | H04B 7/063 |
| 2018/0020481 A1* | 1/2018 | Ahn | H04W 74/0816 |
| 2018/0049123 A1* | 2/2018 | Park | H04W 76/28 |
| 2018/0206139 A1* | 7/2018 | Wang | H04B 7/15507 |
| 2019/0007964 A1* | 1/2019 | Park | H04W 72/14 |
| 2019/0028163 A1* | 1/2019 | Sakoda | H04B 7/0491 |
| 2019/0208463 A1* | 7/2019 | Lou | H04B 7/0413 |
| 2019/0229796 A1* | 7/2019 | Wee | H04B 7/0695 |
| 2019/0268055 A1* | 8/2019 | Li | H04B 7/0695 |
| 2019/0289576 A1* | 9/2019 | Park | H04W 74/0808 |
| 2020/0059950 A1* | 2/2020 | Oteri | H04W 72/1284 |
| 2020/0120689 A1* | 4/2020 | Abouelseoud | H04W 72/12 |
| 2020/0170040 A1* | 5/2020 | Ahn | H04W 72/0453 |

FOREIGN PATENT DOCUMENTS

| | | |
|---|---|---|
| KR | 20100108184 A | 10/2010 |
| WO | 2015134746 A1 | 9/2015 |
| WO | 2016080410 A1 | 5/2016 |
| WO | 2016130245 A1 | 8/2016 |
| WO | 2016/160727 A1 | 10/2016 |
| WO | 2018085595 A1 | 5/2018 |

OTHER PUBLICATIONS

Alkhateeb et al., "MIMO Precoding and Combining Solutions for Millimeter-Wave Systems," IEEE Communications Magazine, vol. 52, No. 12, pp. 122-131 (Dec. 2014).

Chen et al., "MAC and PHY Proposal for 802.11af," IEEE 802.11-10/0258r0 (Mar. 2010).

Cordeiro, "Specification Framework for TGay," IEEE 802.11-15/1358r5 (Aug. 16, 2016).

Draft Standard for Information Technology—Telecommunications and information exchange between systems—Local and metropolitan area network—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah/D10.0 (Sep. 2016).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 7: Enhanced Throughput for Operation in License-Exempt Bands above 45 GHz, IEEE P802.11ay/D1.0 (Nov. 2017).

Halasz, "Sub 1 GHz license-exempt PAR and 5C," IEEE P802.11 Wireless LANs, IEEE 802.11-10/0001r13 (Jul. 2010).

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).

IEEE Standard for Information technology—Telecommunications and information exchange between systems—Local and metropolitan area networks—Specific requirements; Part 11: Wireless LAN Medium Access Control (MAC) and Physical Layer (PhHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).

Josiam et al., "Generic Control Frame for 802.11ay," IEEE 802.11-16/0677r1 (May 17, 2016).

Kasher et al., "Channel bonding proposals," IEEE 802.11-16/0098r0 (Jan. 2016).

Li et al., "Channel Allocation for SP," IEEE 802.11-17/0433r1 (Mar. 16, 2017).

(56) References Cited

OTHER PUBLICATIONS

Sun et al., "IEEE 802.11 TGay Use Cases," IEEE 802.11-2015/0625r2 (May 2015).
Tarighat et al., "Framework for NG60 Channel Bonding," IEEE 802.11-15/0335r2 (Mar. 2015).
Cariou, "SU-MIMO and MU-MIMO link access," IEEE 802.11-16/0078-00-00 (Jan. 2016).
He, "Proposed Resolution to CID 1-35 on TGaj D0.6 in CC22," IEEE 802.11-15/1054r1 (Sep. 14, 2015).
Huang et al., "Scheduling Allocation on Multi-channels in 11ay," IEEE 802.11-16/1208r0 (Sep. 2016).

\* cited by examiner

METHODS AND APPARATUS FOR ENHANCED DYNAMIC ALLOCATION FOR DIRECTIONAL TRANSMISSION

CROSS REFERENCE TO RELATED APPLICATIONS

This application is the U.S. National Stage, under 35 U.S.C. § 371, of International Application No. PCT/US2017/059962 filed Nov. 3, 2017, which claims the benefit of U.S. Provisional Application No. 62/417,063, filed Nov. 3, 2016, the content of which are hereby incorporated by reference herein.

BACKGROUND

The Institute of Electrical and Electronics Engineers (IEEE) 802.11ad standard specifies the Medium Access Control (MAC) and Physical (PHY) layers for very high throughput (VHT) in the 60 GHz band. Operating over the unlicensed 60 GHz frequency band, it allows devices to communicate without wires at multi-gigabit per second speeds. For example, users may download and share 4K videos in seconds as well as sync photo albums and access cloud content in near real time. In addition, devices that enable the 802.11ad standard may be equipped with compact antenna or antenna arrays (e.g., up to 32 antennas) and thereby can dynamically create very narrow beams that focus towards specific user devices. For this kind of directional multi-gigabit (DMG) data transmission, the 802.11ad standard defines a channel access scheme that allows users for near real time data transmission (e.g., up to 7 Gbit/s). However, this scheme is limited to single data stream transmission on a single channel. It does not support multi-channel transmission and multiple data stream transmission such as multiple-input and multiple-output (MIMO). Thus, it would be desirable to have methods and apparatus that dynamically allocate operating channels and data streams for multiple channel transmission and MIMO.

SUMMARY

Methods and apparatus are described herein for dynamic allocation of multiple channels and data streams that supports multi-channel transmission and multiple-input and multiple-output (MIMO). For example, an Institute of Electrical and Electronics Engineers (IEEE) 802.11 station (STA) may receive a poll (Poll) frame from an access point (AP). The Poll frame may include a time offset, a channel offset and antenna/sector settings to enable MIMO and multi-channel transmission. Based on the received Poll frame, the STA may transmit a service period request (SPR) frame that includes a MIMO control field and a multi-channel control field. The MIMO control field may indicate whether the STA supports MIMO transmission. The multi-channel control field may indicate whether the STA supports multi-channel transmission. The SPR frame may further include a multi-user/single-user (MU/SU) field and a dynamic allocation information field. Upon transmitting the SPR frame, the STA may receive a grant frame from the AP. The grant frame may include an antenna configuration and a multi-channel allocation to enable the STA to perform the MIMO transmission and the multi-channel transmission.

BRIEF DESCRIPTION OF THE DRAWINGS

A more detailed understanding may be had from the following description, given by way of example in conjunction with the accompanying drawings wherein:

FIG. 10 is a diagram illustrating a first example enhanced poll and request procedure;

DETAILED DESCRIPTION

Figure 1A:
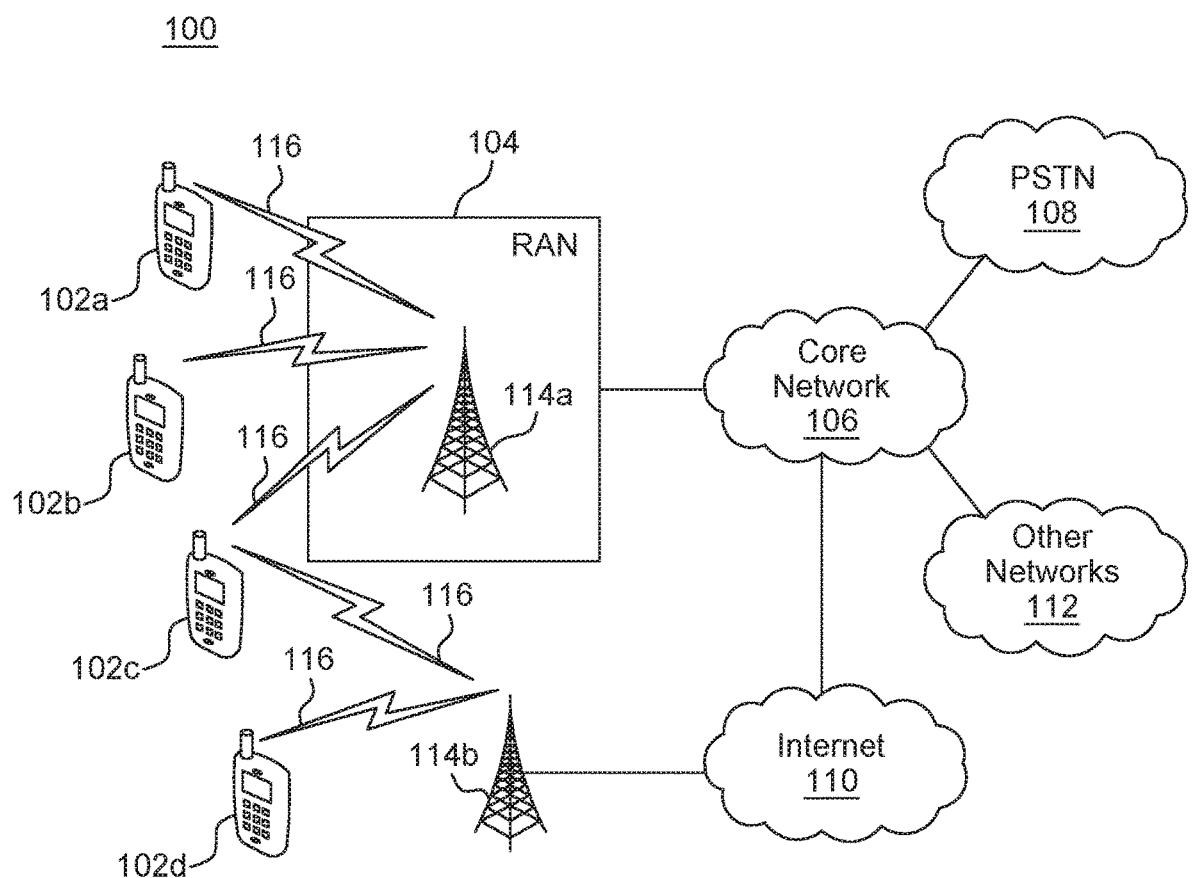
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
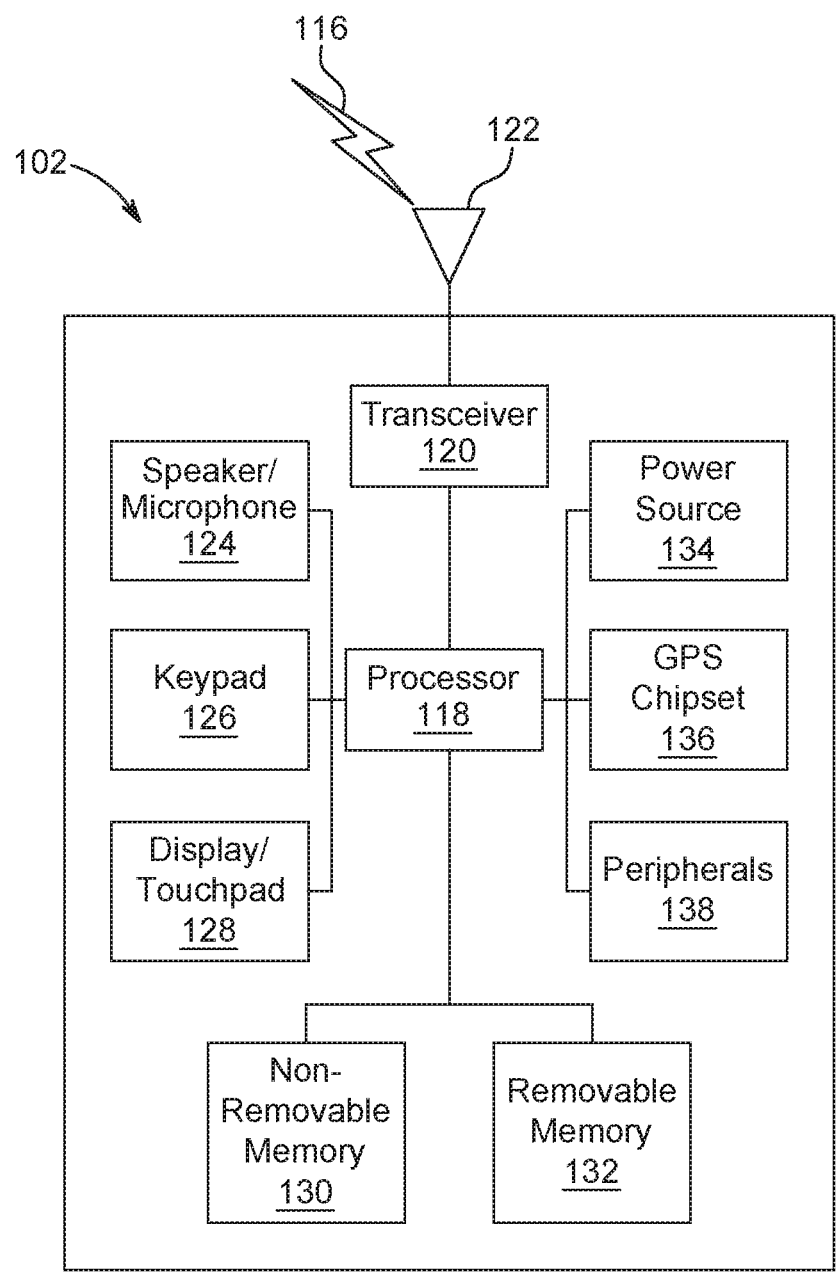
FIG. 1B is a system diagram illustrating an example wireless transmit/receive unit (WTRU) that may be used within the communications system illustrated in FIG. 1A according to an embodiment.
Figure 1C:
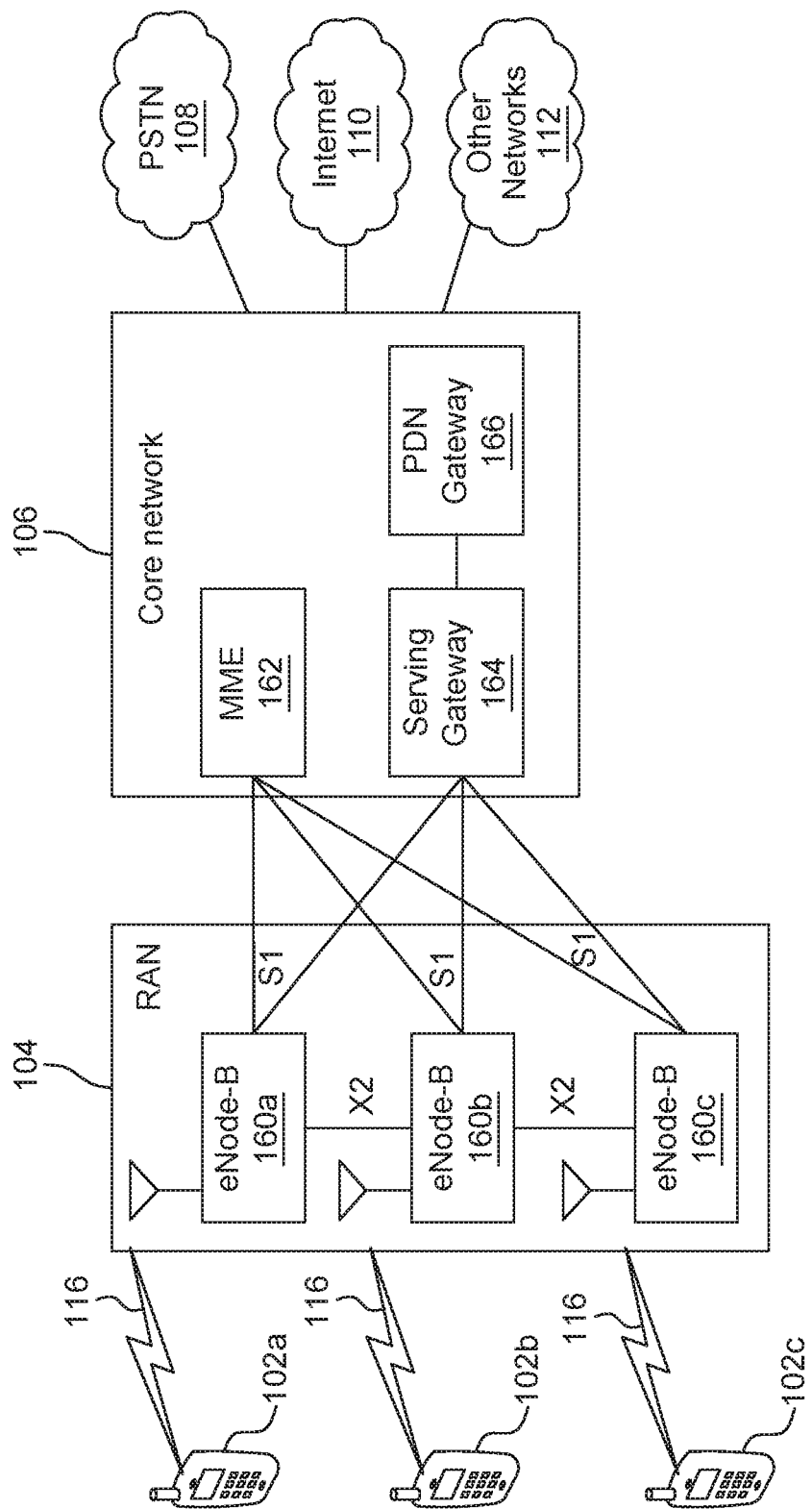
FIG. 1D is a system diagram illustrating a further example RAN and a further example CN that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
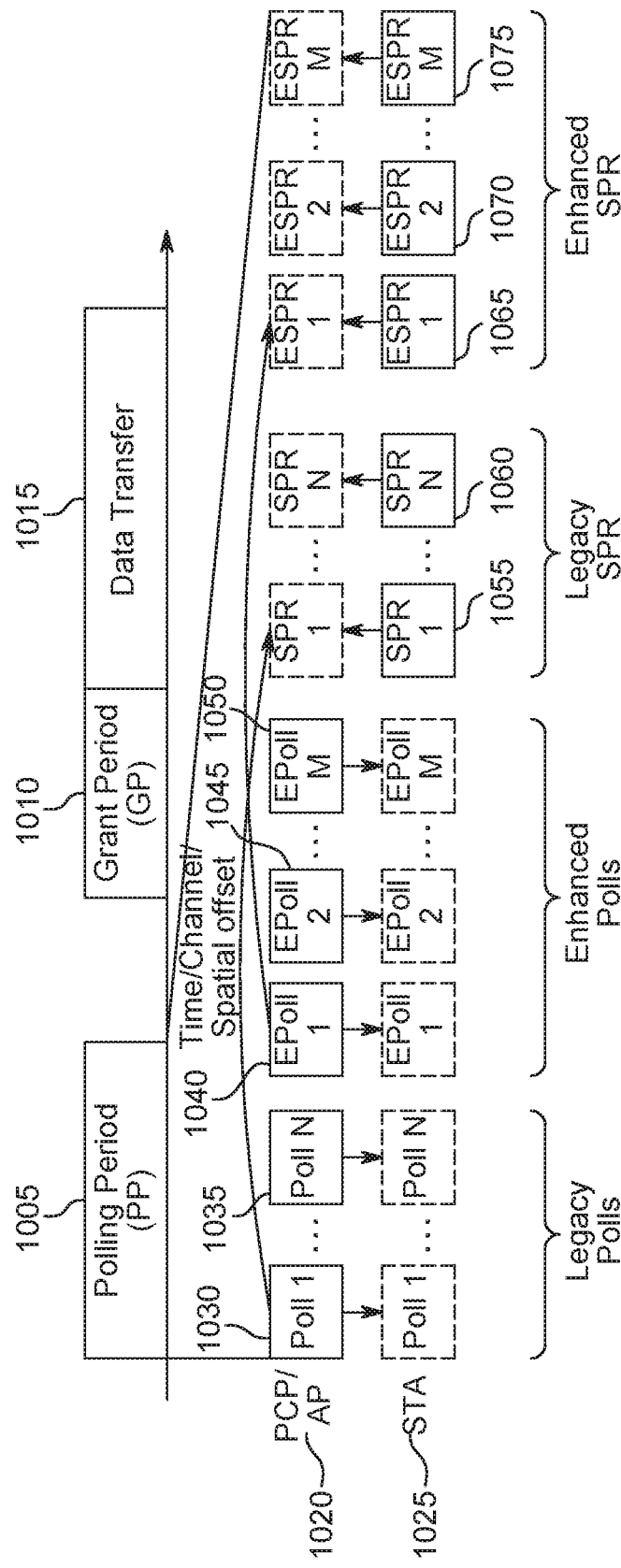
FIG. 10 is a system diagram illustrating an example radio access network (RAN) and an example core network (CN) that may be used within the communications system illustrated in FIG. 1A according to an embodiment.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
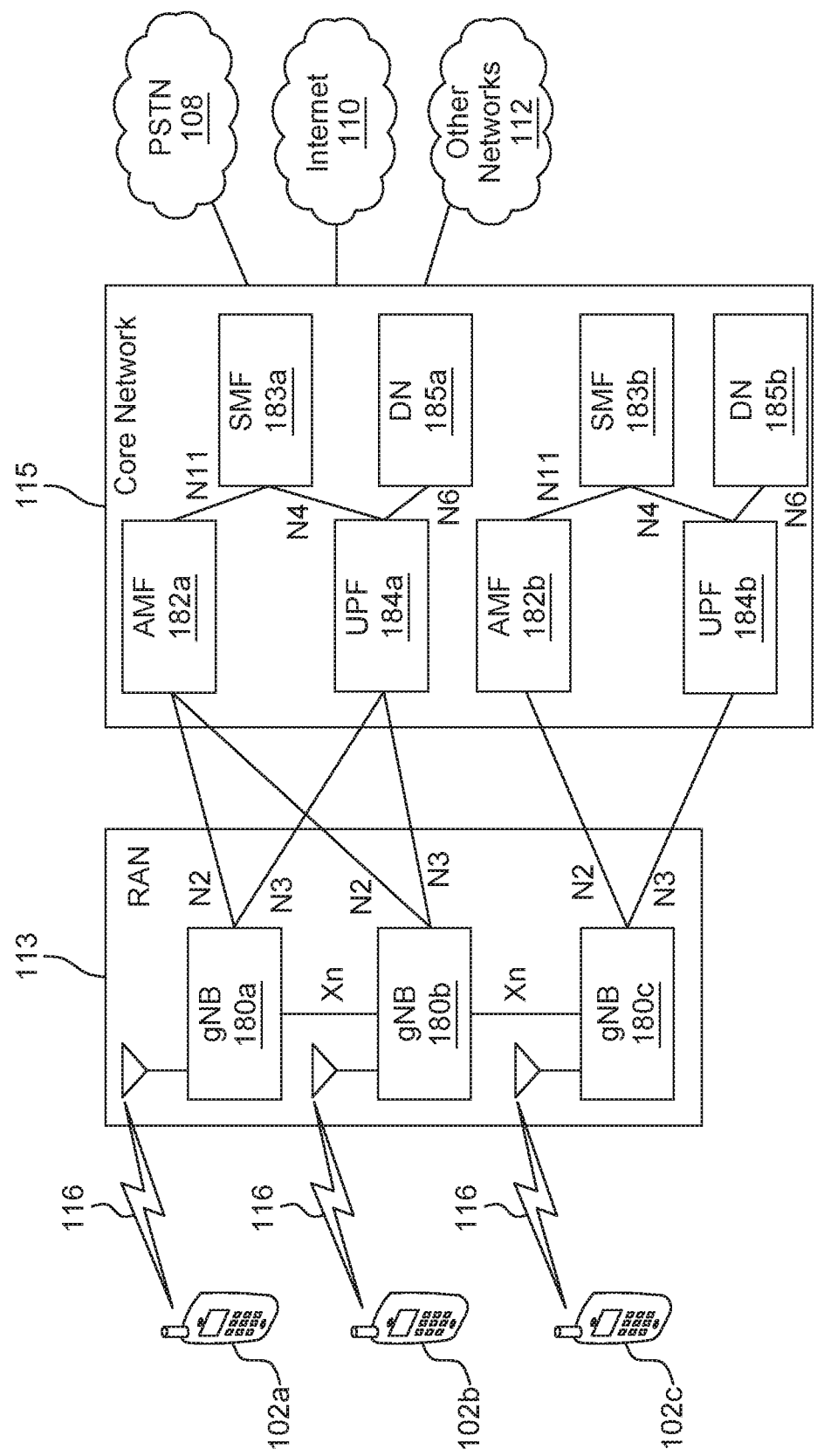

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As used in the embodiments described herein, directional multi-gigabit (DMG) transmission is defined as WLAN transmission that is specified by IEEE 802.11ad using directional millimeter wave (mmW) transmission. Specifically, the DMG may refer to operation in a frequency band containing a channel starting frequency above 45 GHz. As used herein, a DMG station (STA) may refer to a STA whose radio transmitter is capable of transmitting and receiving DMG physical layer (PHY) protocol data units (PPDUs).

As used herein, the Personal Basic Service Set (PBSS) may refer to a DMG basic service set (BSS) that includes one PBSS control point (PCP) in which access to a distribution system (DS) is not present but an intra-PBSS forwarding service is optionally present. As used herein, the PBSS control point (PCP) may refer to an entity that contains at least one STA and coordinates access to the wireless medium (WM) by STAs that are members of a PBSS. As used herein, personal basic service set (PBSS) control point (PCP)/access point (AP) may refer to a STA that is at least one of a PCP or an AP. The terms "PCP/AP", "AP/PCP", or any variations thereof may be used interchangeably herein. As used herein, a non-PCP STA may refer to a STA that is not a PCP. A non-PCP/non-AP station (STA) may refer to a STA that is not a PCP and that is not an AP.

Figure 2:
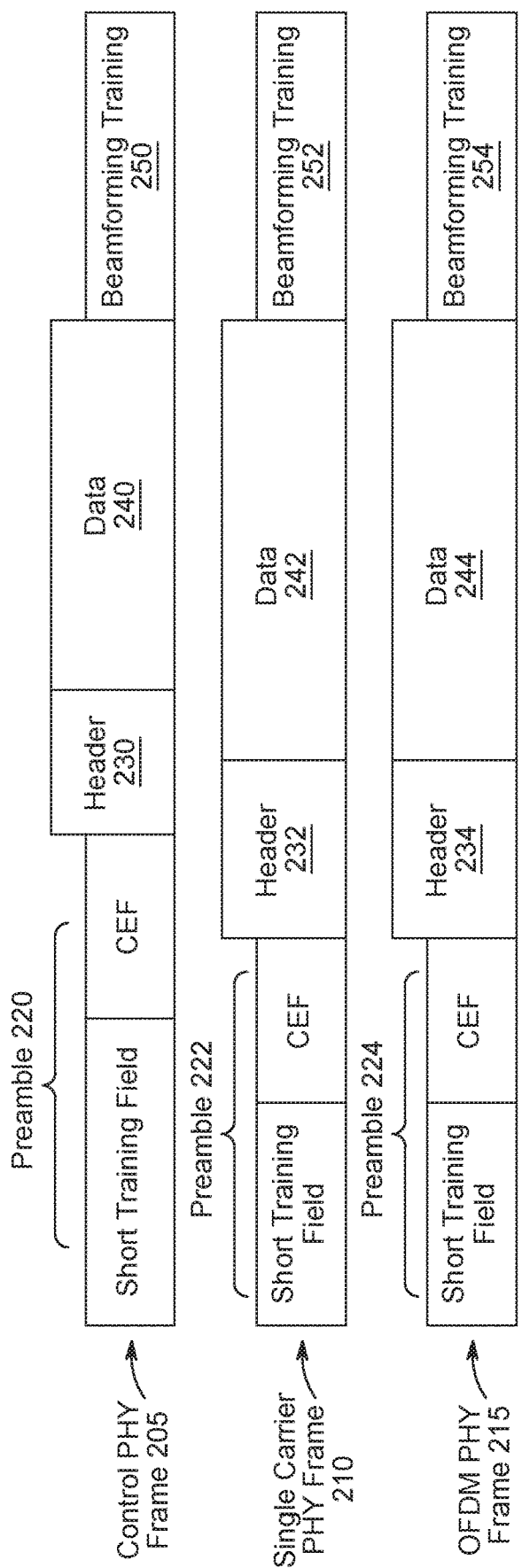
FIG. 2 is a diagram illustrating example physical layer (PHY) protocol data unit (PPDU) formats.

FIG. 2 illustrates example physical layer (PHY) protocol data unit (PPDU) formats (or physical layer frame formats), which may be used in combination with any of other embodiments described herein. As shown in FIG. 2, there are three different frame formats based on PHY modes: a control PHY frame 205, a single carrier PHY frame 210, and an OFDM PHY frame 215. These 802.11ad frames 205, 210, 215 may consist of three parts: a preamble 220, 222, 224, a header 230, 232, 234 and a data field 240, 242, 244. The preamble 220, 222, 224 may be known data pattern used in front end synchronization at the receiver. The front end synchronization may include time, frequency, and channel correction. The header 230, 232, 234 may contain information useful to decode the rest of the packet (i.e. payload). Modulation and coding scheme indications may be carried by the header 230, 232, 234.

As shown in FIG. 2, a control PHY frame 205 is composed of a preamble 220, a header 230, a data field 240, and optionally a beamforming training subfield 250. The preamble 220 may be used for packet detection, automatic gain control (AGC), frequency offset estimation, synchronization, indication of frame type and channel estimation. The preamble is further composed of two parts: a Short Training field (STF) and a Channel Estimation field (CEF). The preamble 208 is followed by the header block 230. The header 230 may consist of several fields that define the details of the PPDU to be transmitted. The data field 240 may consist of the payload data of the Physical Layer Service Data Unit (PSDU).

A single carrier PHY frame 210 is composed of a preamble 222, a header 232, a data field 242 and optionally a beamforming training subfield 252. The preamble 222 may include a STF and a CEF. The preamble 222 is followed by the header block 232. The header 232 may consist of the payload data of the PSDU and possible padding. The data may be padded with zeros, scrambled, encoded, and modulated. An OFDM PHY frame 215 is also composed of a preamble 224, a header 234, a data field 244 and optionally a beamforming training subfield 254. The preamble 224 may include a STF and a CEF. The preamble 224 is followed by the header block 234. The header 234 may consist of several fields that define the details of the PPDU to be transmitted.

The frames 205, 210, 215 may facilitate a mechanism for beamforming training (e.g., discovery and tracking). The beamforming training protocol may include two components: a sector level sweep (SLS) procedure and a beam refinement protocol (BRP) procedure. The SLS procedure may be used to transmit beamforming training, and the BRP procedure may enable receipt of beamforming training and iterative refinement of both the transmit and receive beams.

Figure 3:
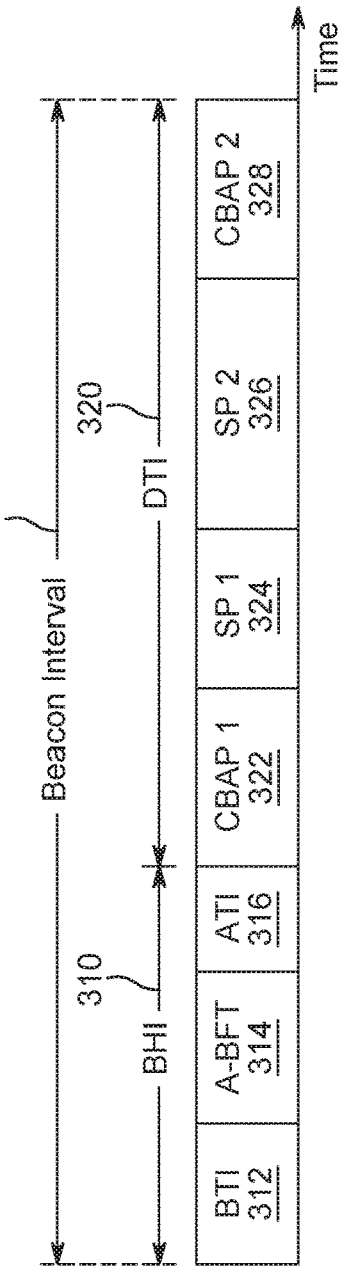
FIG. 3 is a diagram illustrating an example directional multi-gigabit (DMG) channel access scheme.

FIG. 3 illustrates an example DMG channel access scheme, which may be used in combination with any of other embodiments described herein. In this example, a beacon interval 305 may include a beacon header interval (BHI) 310 and a data transmission interval (DTI) 320. The BHI 310 may facilitate exchange of management information and network announcements using a sweep of multiple directionally transmitted frames. The BHI 310 may include a beacon transmission interval (BTI) 312, an association beamforming training (A-BFT) sub-interval 314, and an announcement transmission interval (ATI) 316. The BTI 312 may be an access period during which one or more DMG beacon frames may be transmitted. Not all DMG beacon frames may be detectable by all non-PCP and non-AP STAs. Further, not all beacon intervals 305 may include a BTI 312. A non-PCP STA that is also a non-AP STA may not transmit during the BTI 312 of the Basic Service Set (BSS) of which it is a member.

The A-BFT 314 may be an access period during which beamforming training may be performed with a STA that transmitted a DMG beacon frame during the preceding BTI 312. The presence of the A-BFT 314 may be optional and may be signaled in DMG beacon frames. The ATI 316 may be a request-response based management access period between PCP/AP and non-PCP/non-AP STAs. The presence of the ATI 316 may be optional and may be signaled in DMG beacon frames.

The DTI 320 may be an access period during which frame exchanges may be performed between STAs. There may be a single DTI 320 per beacon interval, and the DTI 320 may include contention-based access periods (CBAPs) 322, 328 and scheduled service periods (SPs) 324, 326. Since SLS is performed in the BHI 310, in the DTI 320, PCP/AP and STAs may be assumed to know the transmit (Tx) and receive (Rx) directions to enable basic communication link and information exchange, although a beam refinement protocol (BRP) may be carried out during this interval for better link quality, especially for data transmission. In certain conditions, SPs 324, 326 and CBAPs 322, 328 may be used for dynamic allocation, which may be used to allow for near real time reservation of channel time with the PCP/AP. This type of access may be used in addition to the SPs 324, 326 and CBAPs 322, 328.

Figure 4:
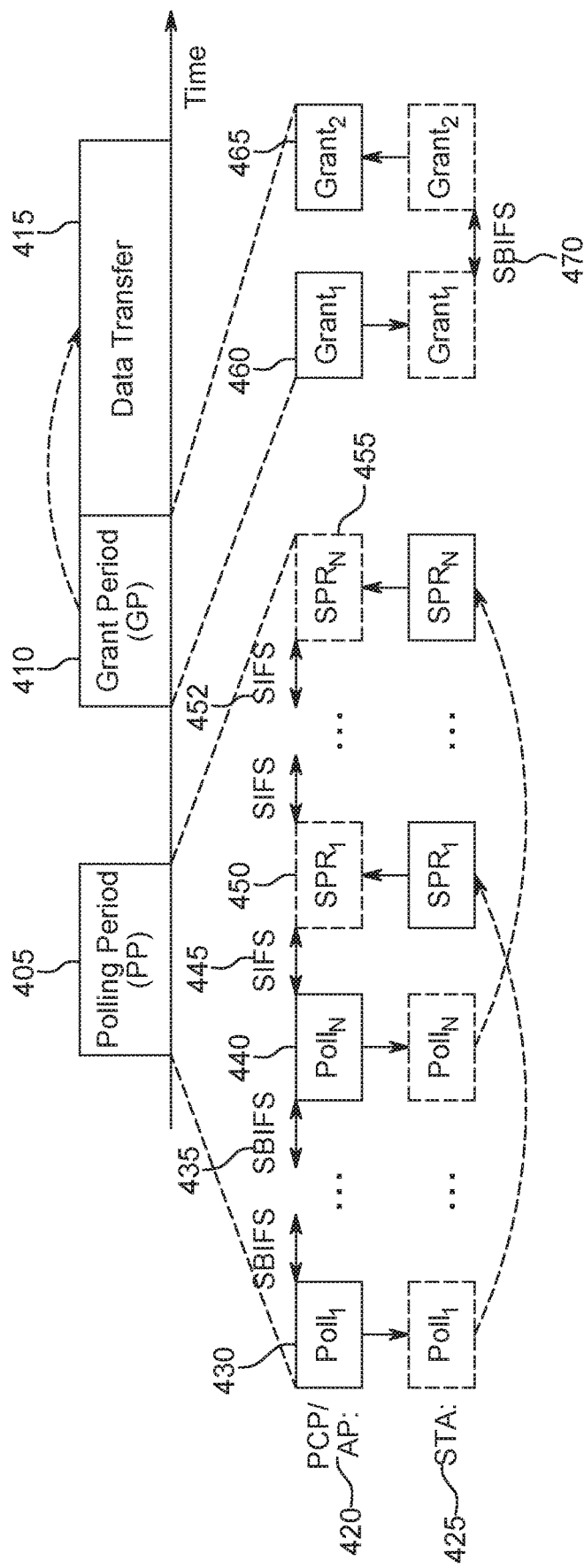
FIG. 4 is a diagram illustrating an example dynamic allocation of service period.

FIG. 4 illustrates an example dynamic allocation of service period, which may be used in combination with any of other embodiments described herein. In this example, dynamic allocation may include a polling period (PP) 405 and a grant period (GP) 410. During the PP 405, a PCP/AP 420 may send poll frames (Polls) 430, 440 to STAs 425 and receive service period request frames (SPRs) 450, 455 to allocate channel time for data transmission. Each of the Poll frames 430, 440 may be separated by Short Beamforming Interframe Space (SBIFS) 435 as examples. The Poll$_N$ 440 and SPR$_1$ 450 may be separated by Short Interframe Space (SIF) duration 445 as examples. Similarly, each of the SPR frames 450, 455 may be separated by SIF duration 452 as examples. Based on the received SPR frames 450, 455, the PCP/AP 420 may accept the request and transmit grant frames (Grants) 460, 465 to allocate channel time for the STAs 425 to communicate with other STAs during the GP 410. After receiving the Grant frames 460, 465, the STAs may transfer data 415 to another STAs based on Grant frames 460, 465. The Grant frames 460, 465 may be separated by SBIFS duration 470 as examples.

Figure 5:
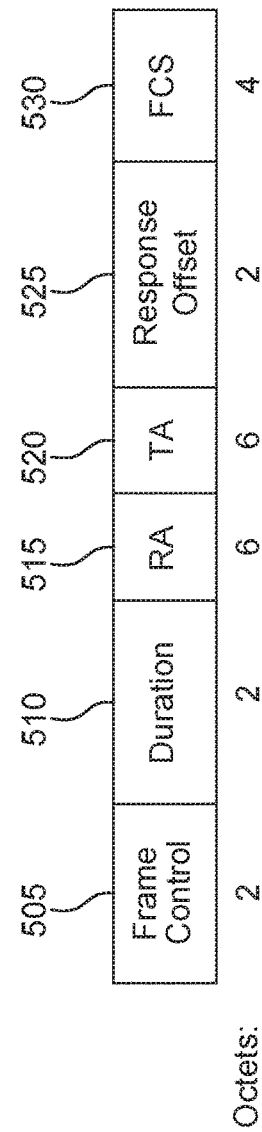
FIG. 5 is a diagram illustrating an example poll (Poll) frame format.

FIG. 5 illustrates an example poll frame format, which may be used in combination with any of other embodiments described herein. As shown in FIG. 5, the poll frame may include a frame control field 505, duration field 510, receiver address (RA) 515, transmitter address (TA) 520, response offset 525, and frame check sequence (FCS) 530. The fame control field 505 may contain control information such as protocol version, type, and subtypes. The frame control field 505 may also provide information necessary for the following fields to understand how to process the poll frame. The duration field 510 may be set to include the duration (in microseconds) of the remaining poll frame transmissions, plus all appropriate Interframe Spaces (IFSs), plus the duration of the service period request (SPR) frame transmissions. The RA field 515 may contain the Medium Access Control (MAC) address of the STA being polled. The TA field 520 may contain the MAC address of the PCP or AP. The response offset field may indicate the offset (in units of 1 ps) beginning SIFS after the end of the poll frame when the SPR frame in response to this poll frame is transmitted. The FCS 530 may include extra error-detecting codes used for transmitting STAs and receiving STAs to verify whether any errors occurred in the frame during the transmission.

Figure 6:
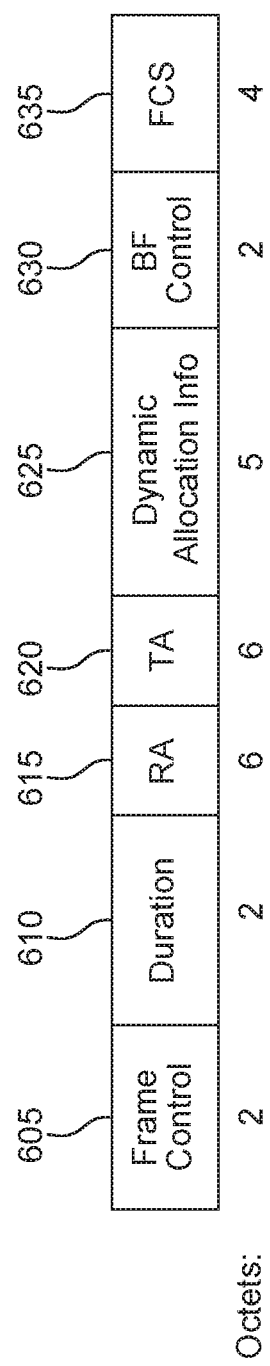
FIG. 6 is a diagram illustrating an example service period request (SPR) frame format.

FIG. 6 illustrates an example service period request (SPR) frame format, which may be used in combination with any of other embodiments described herein. As shown in FIG. 6, the SPR frame may include a frame control field 605, duration field 610, receiver address (RA) 615, transmitter address (TA) 620, dynamic allocation information 625, beam forming (BF) control field 630, and frame check sequence (FCS) 635. When an SPR frame is sent in response to a poll frame, the duration field 610 in the SPR frame may be set to the value of the duration field 510 contained in the poll frame, minus the value of the response offset field 525 contained in the poll frame multiplied by its unit, minus SIFS, minus the time taken to transmit the SPR frame. When the SPR frame is not sent in response to a poll frame and transmitted within an SP or a transmission opportunity (TXOP) allocation, the duration field 610 may be set to the time left in the allocation excluding the SPR transmission time. In all other cases, the duration field 610 may be set to 0.

The dynamic allocation information field 625 may include several subfields such as allocation type, source association identification (Source AID), destination association identification (Destination AID), allocation duration or the like, in order to request allocation of channel time. For example, the Source AID field may identify the STA that is the source of the allocation. The Destination AID field may identify the STA that is the destination of the allocation. When the dynamic allocation information field 625 is transmitted within an SPR frame, the allocation duration subfield may contain the requested duration in microseconds. The beam-forming (BF) control field 630 may include several subfields such as beamforming training, number of sectors, number of receiver DMG antennas, or the like, in order to control antennas and sectors for beamforming. For example, the beamforming training subfield may indicate whether or not the source DMG STA intends to initiate beamforming training with the destination DMG STA at the start of the allocation. The RA field 615 may contain the MAC address of the PCP or AP. The TA field 620 may contain the MAC address of the STA transmitting the SP request. The frame control field 605 and frame check sequence (FCS) 635 in the SPR frame may include similar information to those in the poll frame described in FIG. 5.

Figure 7:
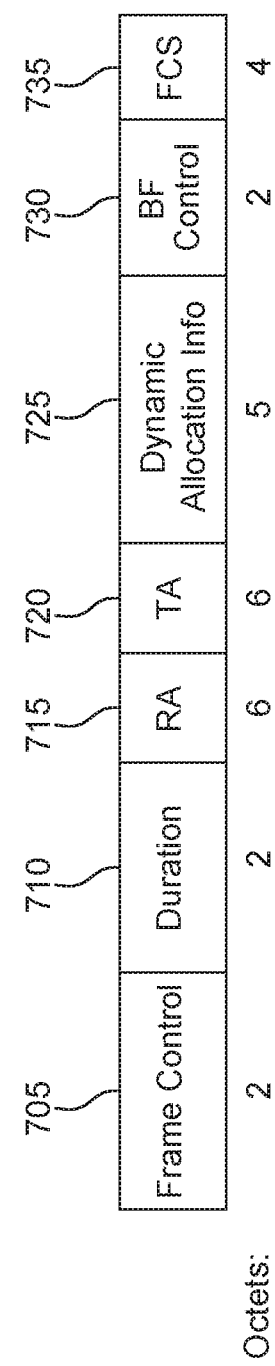
FIG. 7 is a diagram illustrating an example grant frame format.

FIG. 7 illustrates an example grant frame format, which may be used in combination with any of other embodiments described herein. As shown in FIG. 7, the grant frame may include a frame control field 705, duration field 710, receiver address (RA) 715, transmitter address (TA) 720, dynamic allocation information 725, beam forming (BF) control field 730, and frame check sequence (FCS) 735. The duration field 710 in the grant frame may be set to cover the time (in microseconds) to transmit the remaining grant frames if required, the related IFS, 2×SIFS, and the allocation duration carried in the dynamic allocation information field 625 in the SPR frame described in FIG. 6. To broadcast grant frames, the duration field 710 may be set to cover for the duration of all remaining grant frames plus the granted time (in microseconds). The RA field 715 may contain the MAC address of the STA receiving the SP grant. The TA field 720 may contain the MAC address of the STA that has transmitted the grant frame.

When the dynamic allocation information field 725 is transmitted within a grant frame, the allocation duration subfield may contain the granted duration of the service period (SP) or contention based access period (CBAP) allocation in microseconds. When the BF control field 730 is transmitted in a grant frame, the BF control field may include a total number of sectors subfield that indicates the total number of sectors the initiator uses. The frame control field 705 and frame check sequence (FCS) 735 in the grant frame may include similar information to those in the poll or SPR frame described in FIG. 5 and FIG. 6.

IEEE 802.11ay standard includes modifications to both IEEE 802.11 PHY and MAC layers. It may enable at least one mode of operation capable of supporting a maximum throughput of at least 20 gigabits per second (measured at the MAC data service AP), while maintaining or improving power efficiency at a STA. The 802.11ay standard also defines operations for license-exempt bands above 45 GHz while ensuring backward compatibility and coexistence with legacy DMG STAs (e.g., as defined by IEEE 802.11ad) operating in the same band. IEEE 802.11ay may also include multiple-input multiple-output (MIMO) transmissions, including single user (SU)-MIMO and multi-user (MU)-MIMO. Further, IEEE 802.11ay may cover multi-channel transmission, including channel bonding and channel aggregation.

Channel bonding or channel aggregation may be a practice commonly used in IEEE 802.11 implementations in which two contiguous or non-contiguous channels within a given frequency band are combined to increase throughput between two or more wireless devices. For example, two contiguous channels may create wideband channel bonding to increase throughput using higher sampling rate. Two non-contiguous or contiguous channels may create channel aggregation such as 2× aggregation. Specifically, the 2× aggregation may be frequency carrier aggregation that allows STAs to simultaneously sense and detect two 802.11ad channels to transmit data. The difference between the channel bonding and the channel aggregation may be that, in channel bonding, two contiguous channels may be treated as a single medium when STAs are transmitting data. However, in channel aggregation, two non-contiguous channels may be treated as two medium when STAs are transmitting data.

Figure 8A:
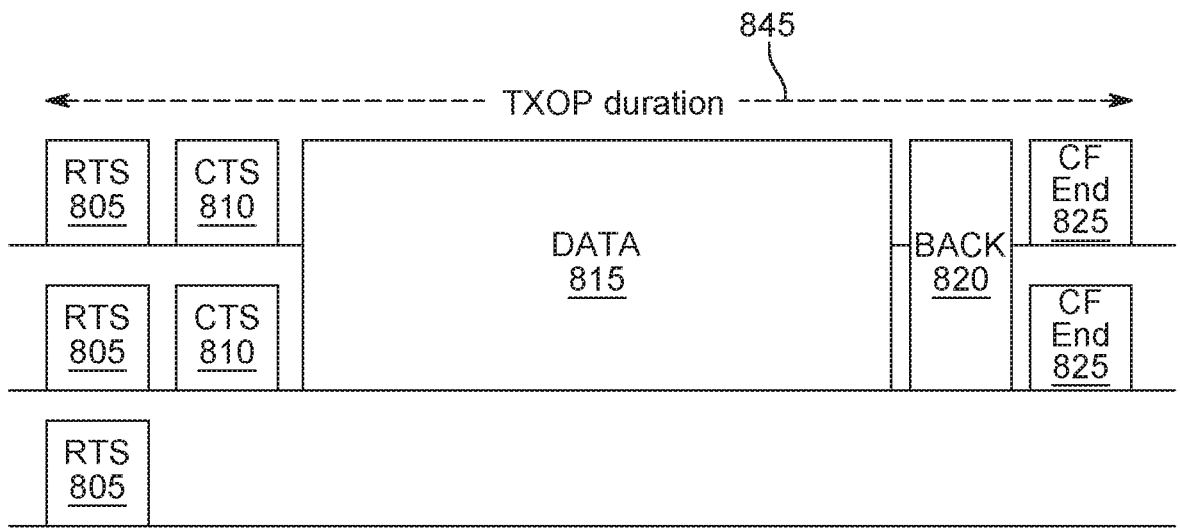
FIG. 8A is a diagram illustrating an example channel bonding data transmission in WLANs.
Figure 8B:
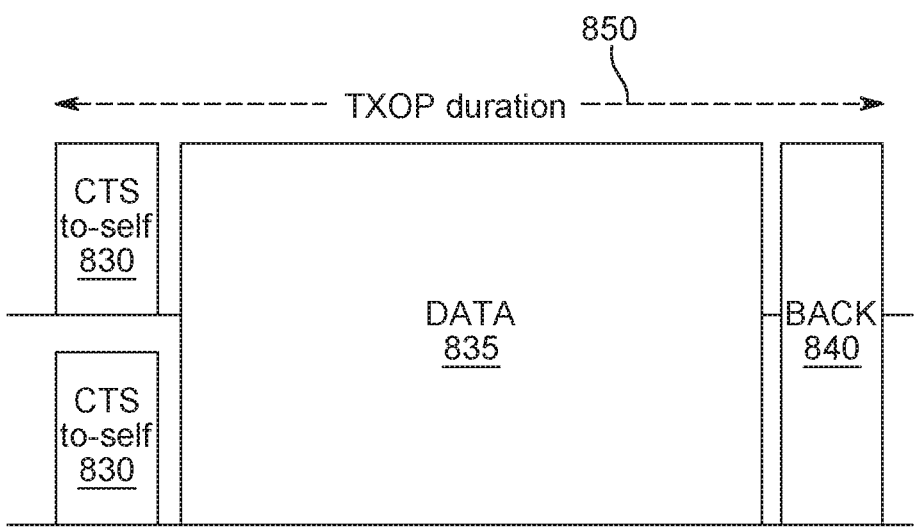
FIG. 8B is a diagram illustrating another example channel bonding data transmission in WLANs.

FIGS. 8A and 8B illustrate two example channel bonding data transmission procedures in WLANs, which may be used in combination with any of other embodiments described herein. In FIG. 8A, a transmitter may reserve a medium with independent request to send (RTS) frames 805 on the channels to be bonded, and a receiver may reply with clear to send (CTS) frames 810. The transmitter may then send a channel bonded data transmission 815 to the receiver. Indication of bonding may be placed in the RTS frames 805 or in the preamble of the transmitted data frame 815. The receiver may reply with a channel bonded acknowledgement (BACK) 820 and the transmitter may reply with two contention-free end frames (CF-ENDs) 825 to end the transmission opportunity (TxOP) reservation 845. In FIG. 8B, a transmitter may reserve a medium with CTS-to-self frames 830 on the channels to be bonded. The transmitter may then send a channel bonded data transmission 835 to a receiver. Indication of bonding may be placed in the CTS-to-self frames 830 or in the preamble of the transmitted data frame 835. The receiver may reply with a channel bonded ACK (BACK) 840.

For the embodiments described above with respect to FIGS. 8A, and 8B, full carrier sense (e.g., physical and virtual) may be maintained on the primary channel. Further, an enhanced DMG (EDMG) STA may transmit a frame to a peer EDMG STA to indicate intent to perform channel bonding transmission to the peer STA. This may allow an EDMG STA to choose to operate over multiple channels only after receiving such a frame, thus saving power. When using multiple channels, a PCP or an AP may simultaneously transmit to multiple STAs allocated to different channels individually. Further, SPs and scheduled CBAPs may be allocated over more than one channel and/or over a bonded channel. These allocations may not be required to include the primary channel. When allocations over different channels overlap in time, the source and destination of such allocations may be different, and channels used for such allocations may be limited to the operating channels of the BSS.

Figure 9:
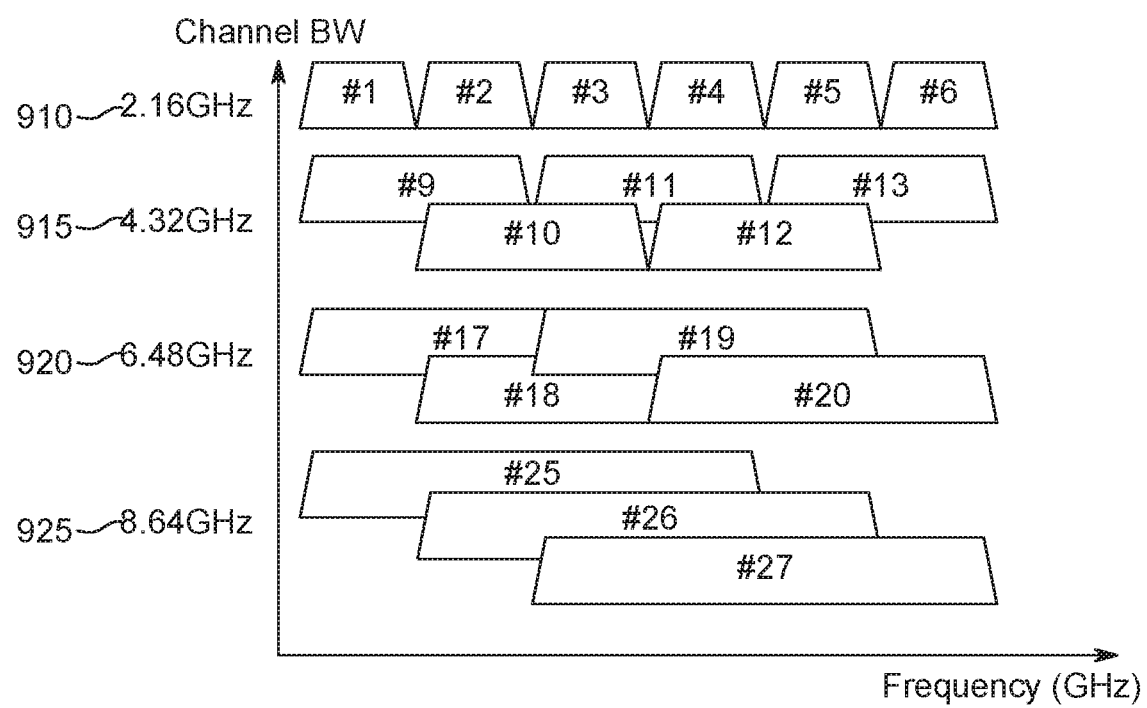
FIG. 9 is a diagram illustrating example channelization in IEEE 802.11ay.

FIG. 9 is a diagram of example channelization in IEEE 802.11ay, which may be used in combination with any of other embodiments described herein. As described above, channel aggregation or channel bonding may be supported by the IEEE 802.11ay. Such channel aggregation or channel bonding may include, but are not limited to, a 2.16 GHz+2.16 GHz mode, a 4.32 GHz+4.32 GHz mode, or any combination thereof. For example, two channels in 2.16 GHz bandwidth (e.g., #1 and #2) 910 may form a channel with 4.32 GHz bandwidth (e.g., #9) 915. Similarly, a channel in 4.32 GHz bandwidth 915 and a channel in 2.16 GHz bandwidth 910 may form a channel with 6.48 GHz bandwidth (e.g., #17) 920. In addition, two channels in 4.32 GHz bandwidth (e.g., #9 and #11) 915 or one channel in 2.16 GHz (e.g., #1) 910 and one channel in 6.48 GHz (e.g., #18) 920 may form a channel in 8.64 GHz bandwidth (e.g., #25) 925. For channel bonding, one waveform may be used and a center frequency may be located at the middle of the bonded channel. For channel aggregation, separate waveforms may be used on separate aggregated channel and each may have its own center frequency.

In order to implement the channel bonding or channel aggregation, an EDMG-Header-A, which is the PHY header for EDMG devices, may include the following fields: bandwidth, channel coding (e.g., to differentiate between channel bonding and channel aggregation), primary channel or the like. These fields may be included in a Control Trailer for RTS/CTS setup or the like. A duplicated RTS/CTS approach may be used to carry the bandwidth information for efficient channel bonding operation.

As described above, IEEE 802.11ay supports MIMO and multi-channel transmission. However, polling, request and grant procedures (e.g., as described above with respect to IEEE 802.11ad) are designed for single data stream transmission on a single channel and do not support MIMO/multi-channel transmissions. For example, an AP/STA may poll STAs using poll frames, and the STAs are expected to respond with an SPR frame to request a transmit time allocation. The polling period may involve two steps. In the first step, an AP/PCP may poll STAs one after another, and the polling frame may be addressed to a single STA each time. In the second step, the STAs may respond with an SPR frame in a desired time offset indicated in the previous poll frame. In another example, individual grant frames may be transmitted by an AP/PCP to allocate a time slot between source and destination STAs. Directional transmission between the source and destination STAs may follow the grant frame. Thus, it would be desirable to have methods and apparatus that support IEEE 802.11ay by providing for MIMO/multi-channel compatible polling, request and grant procedures while maintaining backward compatibility.

A first set of embodiments includes enhanced poll and request procedures. In one set of embodiments, the legacy poll/SPR and enhanced poll/SPR (EPoll/ESPR) may be separated in time. In another set of embodiments, the poll/SPR and EPoll/ESPR may be separated in frequency or in the spatial domain. In these embodiments, legacy may refer to any concept or idea related to IEEE 802.11ad or prior WLAN standards, and enhanced may refer to any concept or idea related to IEEE 802.11ay or newer WLAN standards. For example, the term "legacy" may refer to DMG and the term "enhanced" may refer to enhanced DMG (EDMG). Enhanced Poll, enhanced SPR, and enhanced Grant frames may be Medium Access Control (MAC) frames defined in IEEE 802.11 standards.

In embodiments where legacy Poll/SPR and EPoll/ESPR frames are separated in time, legacy Polls may be transmitted first followed by EPolls. Legacy SPRs may be transmitted after the EPolls and followed by ESPRs. Alternatively, legacy Polls and SPRs may be transmitted after EPolls and ESPRs. In another alternative, a legacy polling period, including legacy Polls and SPRs, may be performed at the beginning of the polling period. Enhanced polling, including EPolls and ESPRs, may be performed after the legacy polling period.

EPoll and ESPR frames may include information regarding MIMO and multi-channel capabilities as well as control information regarding MIMO and multi-channel transmissions. This information may be exchanged between PCP/AP and STAs, between STAs, or between PCP/APs. For example, a PCP/AP may grant STAs an allocation for MIMO and/or multi-channel transmission based on this information. Later on, with an enhanced grant frame, the transmitter and receiver may acquire beam pairing information and other MIMO and multi-channel related information. Thus, a MIMO setup frame and/or Multi-channel setup frame may be optional or omitted in dynamic allocation based on the EPoll and ESPR frames.

FIG. 10 illustrates a first example enhanced poll and request procedure. In this example, legacy Poll/SPR 1030, 1035, 1055, 1060 and EPoll/ESPR 1040, 1045, 1050, 1065, 1070, 1075 may be separated in time, and EPoll 1040, 1045, 1050 and ESPR 1065, 1070, 1075 may be individually addressed in a frame. As shown in FIG. 10, a PCP/AP 1020 may acquire the media by contention or scheduling and may start a polling period (PP) 1005 when certain conditions are met. The PP 1005 may include legacy Polls 1030, 1035 and Enhanced Polls 1040, 1045, 1050.

The PCP/AP 1020 may transmit legacy Poll frames 1030, 1035 using legacy PPDUs. The legacy Poll frames 1030, 1035 may be separated by an x interframe space (xIFS) duration. For example, the xIFS may be a Short Beamforming Interframe Space (SBIFS), Beam Refinement Protocol Interframe Space (BRPIFS), Medium Beamforming Interframe Space (MBIFS), Long Beamforming Interframe Space (LBIFS), or the like. The Response Offset field in the legacy Poll frame 1130, 1135 may indicate the offset in time, which may be calculated to include the time duration used for the EPoll frames 1040, 1045, 1050.

An xIFS duration after the end of last legacy Poll frame (i.e. Poll N) 1035, the PCP/AP 1020 may transmit the EPoll frames 1040, 1045, 1050. For example, the xIFS may be an SBIFS or a duration slightly longer than an SBIFS. EPoll frames 1040, 1045, 1050 may be separated by a yIFS duration. For example, the yIFS duration may be an SBIFS or may be slightly longer than an SBIFS. The examples of yIFS duration may include, but are not limited to, SBFS, BRPIFS, MBIFS, and LBIFS.

EPoll MAC frames 1040, 1045, 1050 may be individually addressed to a STA 1025. In this case, the RA field of the EPoll MAC frame 1040, 1045, 1050 may be the MAC address of the receiving STA 1025. Each EPoll frame 1040, 1045, 1050 may carry a Response Offset field, a Channel Offset field, a Response Antenna Setting and/or Response Sector Setting and/or Response Polarization Setting field, an ESPR field, or the like. The Response Offset field may indicate the offset in time (e.g., in units of 1 μs). The offset may be the time period between the end of the EPoll frames 1040, 1045, 1050 and their respective ESPR frames 1065, 1070, 1075. For example, an offset included in an EPoll1 frame 1040 may indicate a time period when an ESPR1 frame 1065 needs to be transmitted to the PCP/AP 1020. The Channel Offset field may be included in the EPoll frame 1040, 1045, 1050, which may indicate a channel or channels on which the corresponding ESPR frame 1065, 1070, 1075 may be transmitted. The Response Antenna Setting, Response Sector Setting, and/or Response Polarization Setting field may indicate the antenna/sector/polarization settings for the ESPR frame 1065, 1070, 1075. In an embodiment, these antenna/sector/polarization settings may be referred to as spatial offset. The ESPR field may indicate whether the expected response frame is an SPR 1055, 1060 or ESPR frame 1065, 1070, 1075.

A physical layer (PHY) protocol data unit (PPDU) that carries the EPoll frame 1040, 1045, 1050 may be a legacy PPDU or an enhanced PPDU. The legacy PPDU may be transmitted with a single data stream on a primary channel. If multiple channels are available for the PCP/AP 1020, transmission of the PPDU may be duplicated on each channel with or without phase rotation. The enhanced PPDU may be transmitted with one or more data streams on one or more channels. The PPDU may be transmitted using Quasi-Omni direction or a beamformed direction for single data transmission, which may have been previously trained between the PCP/AP 1020 and the STA 1025.

A STA that has received a Poll/EPoll frame 1030, 1035, 1040, 1045, 1050 from the PCP/AP 1020 may transmit an SPR frame 1055, 1060 or an ESPR frame 1065, 1070, 1075 after the offset duration indicated in the corresponding Poll/EPoll frame 1030, 1035, 1040, 1045, 1050. A STA 1025 that may be polled by a legacy Poll 1030, 1035 may respond with a legacy SPR frame 1055, 1060. STAs 1025 that may be polled by an EPoll frame 1040, 1045, 1050 may respond with either a legacy SPR frame 1055, 1060 or an ESPR frame 1065, 1070, 1075 depending on the ESPR field indicated in the EPoll frame 1040, 1045, 1050. If the ESPR field in the EPoll frame 1040, 1045, 1050 is omitted, a response frame to the EPoll frame 1040, 1045, 1050 may be an ESPR frame 1065, 1070, 1075.

An SPR frame 1055, 1060 may be carried in a legacy PPDU on a primary channel using single stream transmission. An SPR frame 1055, 1060 may be transmitted using Quasi-Omni direction or a beamformed direction. An ESPR frame 1065, 1070, 1075 may be fully understood by enhanced devices, and an ESPR frame 1065, 1070, 1075 may carry a MIMO Control field, a Multi-channel Control field, an MU/SU Control field, a Modulation and Coding Scheme (MCS) Control field, a Dynamic Allocation Information field, or the like.

A MIMO Control field may include several subfields and may be used for ESPR frames 1065, 1070, 1075 and other control or management frames. If a MIMO Control field is included in an ESPR frame 1065, 1070, 1075, the MIMO Control field may carry a MIMO Supported subfield, a Polarization Supported subfield, a Number of Data Streams subfield, a MIMO Training subfield, or the like. The MIMO Supported subfield may indicate whether MIMO is supported by a STA 1025. The Polarization Supported subfield may indicate whether polarization is supported. The Number of Data Streams Subfield may indicate a suggested number of data streams to be transmitted in the requested allocation. The MIMO Training subfield may indicate whether analog MIMO/beamforming (BF) training and digital MIMO/BF training is ready between the source and destination in the requested allocation.

A Multi-channel Control field may include several subfields and may be used for ESPR frames 1065, 1070, 1075 and other control or management frames. If a Multi-channel Control field is included in ESPR frames 1065, 1070, 1075, the field may carry a Channel Aggregation subfield, a Beam per Channel subfield, or the like. The Channel Aggregation subfield may indicate whether channel aggregation or channel bonding is supported by a STA 1025. The Beam per Channel subfield may indicate a number of concurrent beams supported per channel. In an embodiment, this Beam per Channel subfield may be included in the MIMO Control subfield.

A Multi User/Single User (MU/SU) Control field may indicate whether MU or SU is suggested and/or supported for the requested allocation. An MCS Control field may include several subfields and may be used for ESPR frames 1065, 1070, 1075 and other control or management frames. If an MCS Control field is included in an ESPR frame 1065, 1070, 1075, the MCS Control field may carry an MCS subfield, a Space-Time Block Coding (STBC) subfield, a Number of spatial streams subfield, a Short/Long low-density parity-check (LDPC) subfield, or the like. The MCS subfield may indicate a suggested MCS level to be used in the requested allocation. The STBC subfield may indicate whether STBC is suggested and/or supported. The Number of spatial streams subfield may indicate the number of spatial streams suggested and/or supported for the requested allocation. The Short/Long LDPC subfield may indicate suggested short or long LDPC codes for the requested allocation.

A Dynamic Allocation Information field may be calculated based on the MIMO control and Multi-channel Control fields. For example, if a two data stream transmission using channel aggregation with two channels is requested in the MIMO control and Multi-channel control field, the corresponding allocation duration may take the factor of 4 into account. Alternatively or additionally, the Allocation duration field may always be calculated based on a single stream transmission on one channel. In this case, the PCP/AP 1020 may calculate the real duration based on the allocated data stream and channel.

The PPDU that carries an ESPR frame 1065, 1070, 1075 may be a legacy PPDU or an enhanced PPDU. The legacy PPDU may be transmitted with a single data stream on a primary channel. If multiple channels may be available for the PCP/AP 1020, the transmission of the PPDU may be duplicated on each channel with or without phase rotation. The enhanced PPDU may be transmitted with one or more data streams on one or more channels. The PPDU may be transmitted using Quasi-Omni direction or a beamformed direction for single data transmission, which may have previously been trained between the PCP/AP and the STA.

The fields described in the above paragraphs may be shuffled (i.e., the subfields defined for one field may be included in another field or may be directly included in the ESPR frame 1065, 1070, 1075 as a field).

Figure 11:
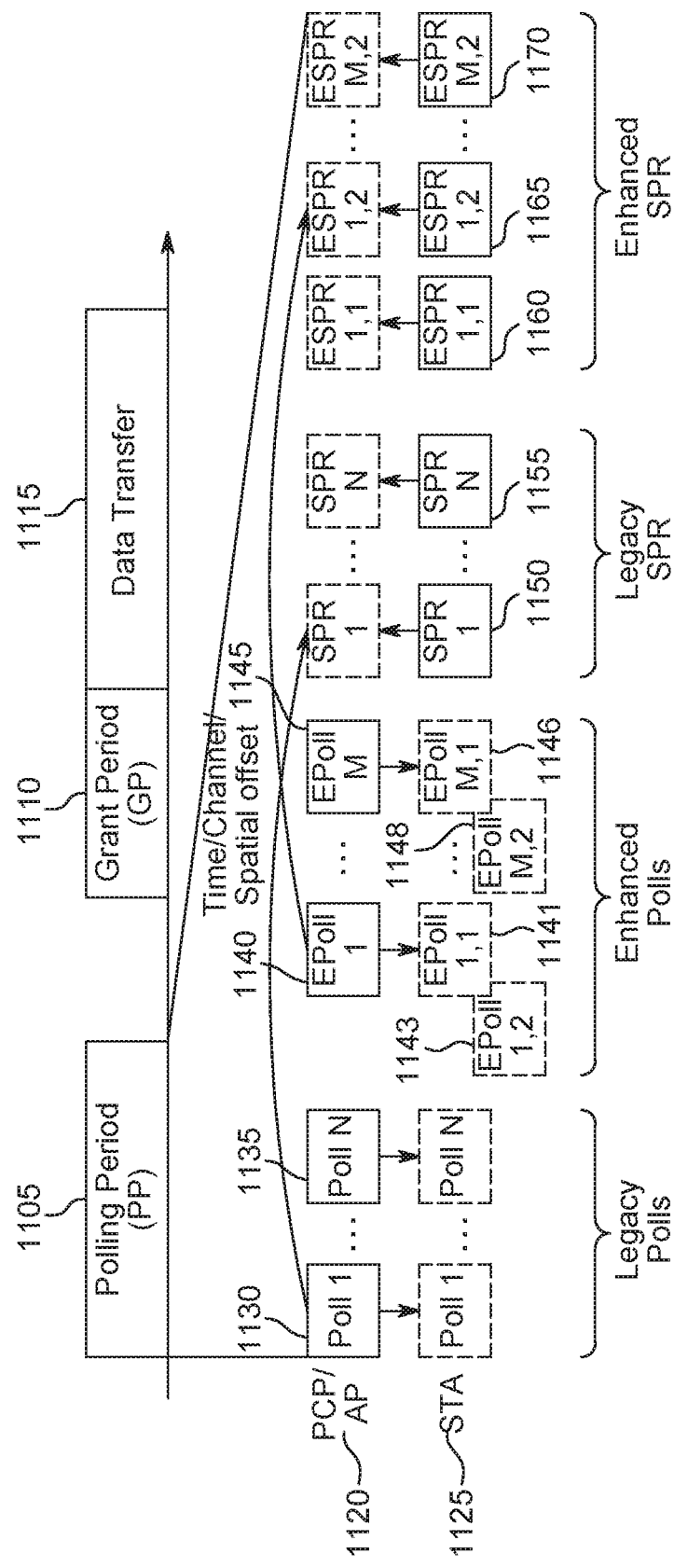
FIG. 11 is a diagram illustrating a second example enhanced poll and request procedure.

FIG. 11 illustrates a second example enhanced poll and request procedure. In this example, legacy Poll/SPR frames 1130, 1135, 1150, 1155 may be performed before EPoll/ESPR frames 1140, 1141, 1143, 1145, 1146, 1148, 1160, 1165, 1170 respectively. The legacy Poll/SPR 1130, 1135, 1150, 1155 and EPoll/ESPR 1140, 1145, 1160, 1165, 1170 are separated in time and the ESPR frame 1160, 1165, 1170 may be individually addressed in a frame. The EPoll frame 1340, 1343, 1341, 1345, 1346, 1348 may be transmitted using downlink (DL) MU transmissions, such as MU-MIMO and Multi-channel MU transmissions.

Similar to the embodiment described in FIG. 10, in FIG. 11, a PCP/AP 1120 may acquire the media by contention or scheduling and may start a polling period (PP) 1105 when certain conditions are met. An xIFS duration after the end of last legacy Poll frame (i.e. Poll N) 1135, the PCP/AP 1120 may transmit EPoll frames 1140, 1141, 1143, 1145, 1146, 1148. EPoll MAC frames 1140, 1141, 1143, 1145, 1146, 1148 may be individually addressed to a STA 1125. In this case, the RA field of the EPoll MAC frame 1140, 1141, 1143, 1145, 1146, 1148 may be the MAC address of the receiver 1125. Each EPoll MAC frame 1140, 1141, 1143, 1145, 1146, 1148 may carry a Response Offset field, a Channel Offset field, a Response Antenna Setting and/or Response Sector Setting and/or Response Polarization Setting field, and an ESPR field as described above. Alternatively, EPoll MAC frame 1140, 1141, 1143, 1145, 1146, 1148 may be group addressed to a group of STAs 1125. In this case, the RA field of the EPoll frame 1140, 1141, 1143, 1145, 1146, 1148 may be a multicast MAC address, a broadcast MAC address, or the like. The group of STAs 1125 may prepare their responses based on the information specified in the EPoll MAC frame 1140, 1141, 1143, 1145, 1146, 1148.

In addition to or alternatively to the fields described above for the individually addressed EPoll frame 1140, 1141, 1143, 1145, 1146, 1148, the group addressed EPoll frame 1140, 1141, 1143, 1145, 1146, 1148 may include a Number of STAs field and one or more STA Information fields. The Number of STAs field may indicate the number of STAs addressed by the EPoll frame 1140, 1141, 1143, 1145, 1146, 1148. The STA Information field(s) may indicate the destination association identifier (AID) and time/frequency/spatial offset information for the STA to send the SPR/ESPR frame 1150, 1155, 1160, 1165, 1170 back. The number of STA Information fields carried in the EPoll frame 1140, 1141, 1143, 1145, 1146, 1148 may be determined by the Number of STAs field. Time/frequency/spatial offset information may be the same as described with respect to the individually addressed EPoll MAC frame 1140, 1141, 1143, 1145, 1146, 1148. For example, the time offset information may refer to the time period between the EPoll1,1 frame 1141 and the ESPR1,1 frame 1160 indicated in the Response Offset field. The frequency offset may refer to a channel or channels on which the ESPR frame 1160, 1165, 1170 is transmitted. The Spatial offset may refer to antenna setting or sector setting indicated in the Response Antenna Setting and/or Response Sector Setting and/or Response Polarization Setting fields.

The PPDU that carries an EPoll frame 1140, 1141, 1143, 1145, 1146, 1148 may be an enhanced PPDU. In case that the EPoll frame 1140, 1141, 1143, 1145, 1146, 1148 is individually addressed, an MU-PPDU may be used. For example, a common preamble may be transmitted at the beginning and a user specific preamble and user specific data portion may follow. If MU-MIMO is used, the data portion for each STA may be carried in a spatial signature. If Multi-channel MU transmission is used, the data portion for each STA may be carried in one or more channel. In case that the EPoll frame is 1140, 1141, 1143, 1145, 1146, 1148 group addressed, the same EPoll frame 1140, 1141, 1143, 1145, 1146, 1148 addressed to multiple STAs may be carried using all the spatial signatures and channels. For example, the same frame may be transmitted using one or more spatial beams and may be repeated with or without phase rotation on multiple channels. The PPDU may be transmitted using Quasi-Omni direction or a beamformed direction for single data transmission, which may have been previously trained between the PCP/AP 1120 and the STA 1125.

Similar to the embodiment illustrated in FIG. 11, in FIG. 11, STAs 1125 that received Poll/EPoll frames 1130, 1135, 1140, 1141, 1143, 1145, 1146, 1148 from the PCP/AP 1120 may transmit SPR 1150, 1155 or ESPR frames 1160, 1165, 1170 after the offset duration indicated in the corresponding Poll/EPoll frames 1130, 1135, 1140, 1141, 1143, 1145, 1146, 1148. STAs 1125 that may be polled by legacy Poll frames 1130, 1135 may respond with legacy SPR frames 1150, 1155. STAs 1125 that may be polled by EPoll frames 1140,

1141, 1143, 1145, 1146, 1148 may respond with either legacy SPR frames 1150, 1155 or ESPR frames 1160, 1165, 1170 depending on the ESPR field indicated in the EPoll frame 1140, 1141, 1143, 1145, 1146, 1148. If the ESPR field in the EPoll frame 1140, 1141, 1143, 1145, 1146, 1148 is omitted, the response to the EPoll frame 1140, 1141, 1143, 1145, 1146, 1148 may be an ESPR frame 1160, 1165, 1170. The SPR frame 1150, 1155 and ESPR frame 1160, 1165, 1170 may be the same as the SPR frame 1155, 1160 and ESPR frame 1165, 1170, 1175 described in FIG. 11 and, therefore, the details of those frames are not repeated here.

As was the case with the embodiment illustrated in FIG. 11, in FIG. 11, the PPDU that carries an ESPR frame 1160, 1165, 1170 may be a legacy PPDU transmitted with a single data stream on a primary channel or an enhanced PPDU transmitted with one or more data streams on one or more channels. For a legacy PPDU, where multiple channels may be available for the PCP/AP 1120, the transmission of the PPDU may be duplicated on each channel with or without phase rotation. The PPDU may be transmitted using Quasi-Omni direction or a beamformed direction for single data transmission, which may have been previously trained between the PCP/AP 1120 and the STA 1125.

Similar to the embodiment illustrated in FIG. 10, in FIG. 11, the above mentioned fields and subfields may be shuffled (i.e., the subfields defined for one field may be included in another field or may be directly included in the ESPR frame 1065, 1070, 1075 as a field).

Figure 12:
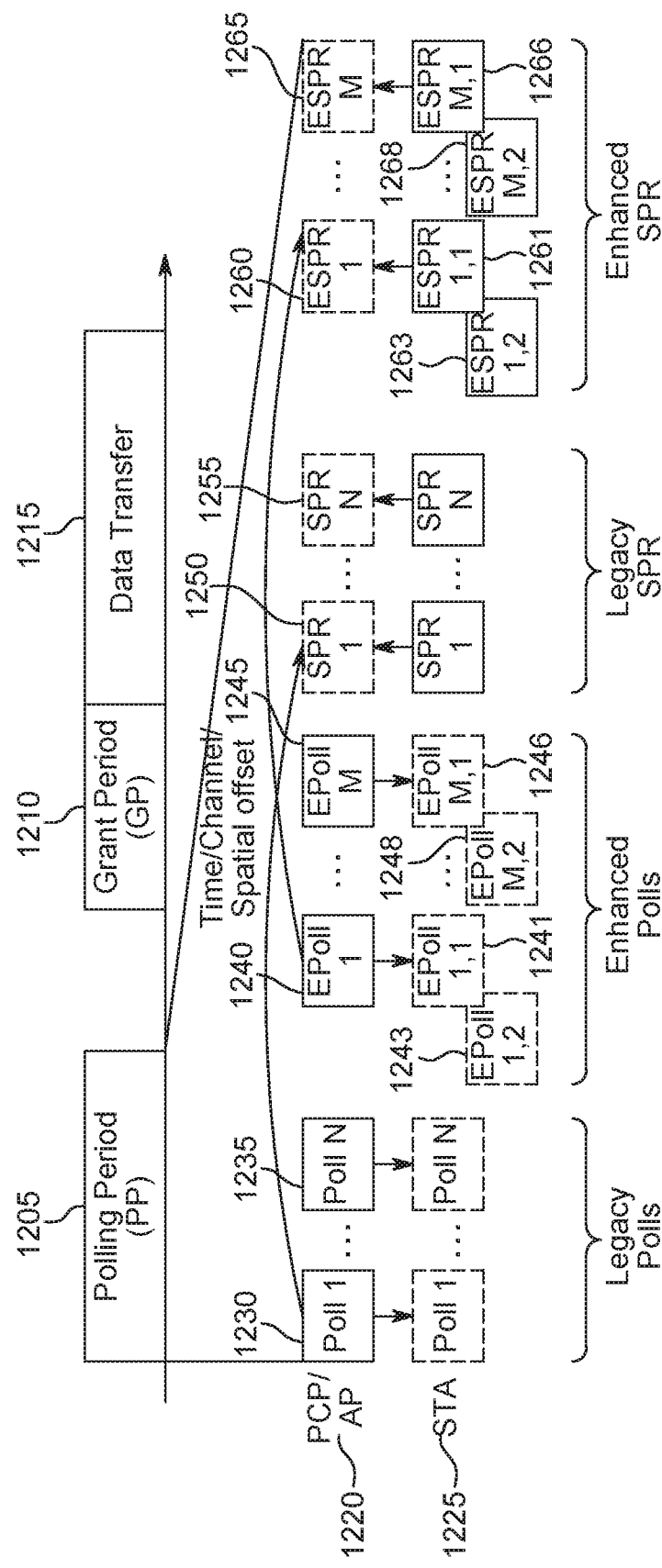
FIG. 12 is a diagram illustrating a third example enhanced poll and request procedure.

FIG. 12 illustrates a third example enhanced poll and request procedure. In this example, legacy poll frames 1230, 1235 and SPR frames 1250, 1255 may be performed before EPoll frames 1240, 1241, 1243, 1245, 1246, 1248 and ESPR frames 1260, 1261, 1263, 1265, 1266, 1268 respectively. Legacy poll/SPR 1230, 1235 1250, 1255 and EPoll/ESPR 1240, 1241, 1243, 1245, 1246, 1248, 1260, 1261, 1263, 1265, 1266, 1268 frames may be separated in time. Both the EPoll frame 1240, 1241, 1243, 1245, 1246, 1248 and ESPR frame 1260, 1261, 1263, 1265, 1266, 1268 may be transmitted using MU transmissions, such as MU-MIMO and Multi-channel MU transmissions.

The methods and frame structures for the embodiment illustrated in FIG. 12 are the same as or similar to those described in FIG. 11 with the following exceptions. In FIG. 12, it may be possible for two or more STAs 1225 to receive EPoll frames 1240, 1241, 1243, 1245, 1246, 1248 with the same time offset. In this case, the two or more STAs 1225 may transmit ESPR frames 1260, 1261, 1263, 1265, 1266, 1268 using MU transmission concurrently (i.e., UL MU transmission). In addition, the PCP/AP 1220 may indicate the potential UL MU transmissions to STAs 1225 using one field (e.g., an MU ESPR field). Other UL-MU-transmission-related-information, such as information to be included in the PLOP header (e.g., legacy header or enhanced header) of the upcoming uplink transmission may be indicated here. Such information may include, for example, MCS, number of spatial stream (Nss), LDPC codeword size, bandwidth (BW), channel aggregation, guard interval (GO/cyclic prefix (CP) length, PHY layer service data unit (PSDU) length, STBC applied, or the like. Regarding the PPDU that carries the ESPR frame 1260, 1261, 1263, 1265, 1266, 1268, if an enhanced PPDU is transmitted with one or more data streams on one or more channels, the enhanced PPDU may be involved in the MU transmission, and the PPDU transmission may follow the EPoll frame 1240, 1241, 1243, 1245, 1246, 1248.

In all of the embodiments described in FIGS. 10, 11 and 12, the Duration field in the Poll, EPoll, SPR and ESPR frames may be set to cover the entire period. For example, the Duration field within each legacy Poll frame i out of a total of N transmitted legacy Polls and M EPolls may be calculated by the following equation (1):

$$\text{Duration}\_i = \text{Duration\_of\_Poll\_transmission}\_i,N + \\ \text{Duration\_of\_EPoll\_transmission} + \\ \text{Offset\_of\_SPR\_transmission}\_N + \\ \text{Offset\_of\_ESPR\_transmission}\_M. \quad \text{Equation (1)}$$

The Duration field within each EPoll frame i out of M EPolls may be calculated by the following equation (2):

$$\text{Duration}\_i = \text{Duration\_of\_EPoll\_transmission}\_i,M + \\ \text{Offset\_of\_SPR\_transmission}\_N + \\ \text{Offset\_of\_ESPR\_transmission}\_M. \quad \text{Equation (2)}$$

The Duration field within each legacy SPR frame i out of a total of N transmitted legacy SPRs and M ESPRs may be calculated by the following equation (3):

$$\text{Duration}\_i = \text{Duration\_of\_SPR\_transmission}\_i,N + \\ \text{Offset\_of\_ESPR\_transmission}\_M. \quad \text{Equation (3)}$$

The Duration field within each ESPR frame i out of M ESPR may be calculated by the following equation (4):

$$\text{Duration}\_i = \text{Duration\_of\_ESPR\_transmission}\_i,M. \quad \text{Equation (4)}$$

In each of the above equations, Duration_of_xxx_transmission_i,k may refer to the duration from the end of the ith frame to the end of kth frame, considering all interframe space and antenna switching time in the middle. The Duration_of_EPoll_transmission may refer to the duration from the end of the last legacy Poll frame to the end of the last EPoll frame. Further, Offset of SPR_transmission_j may be calculated by following equation (5):

$$\text{Offset\_of\_SPR\_transmission}_1 = \text{Poll\_SPR\_space} \\ \text{Offset\_of\_SPR\_transmission}_j = \text{Offset\_of\_SPR\_} \\ \text{transmission}_{j-1} + \text{floor}(TXTIME(SPR_j) + \\ \text{SIFS}, a\text{TSFResolution}) + 1, \quad \text{Equation (5)}$$

where Poll_SPR_space may be the time interval between the end of the last EPoll frame transmitted by the PCP/AP and the expected start time of the first legacy SPR frame by the non-PCP/non AP STA.

Offset_of_ESPR_transmission_j may be calculated by the following equation (6):

$$\text{Offset\_of\_ESPR\_transmission}_1 = \text{Poll\_ESPR\_space} \\ \text{Offset\_of\_ESPR\_transmission}_j = \text{Offset\_of\_ESPR\_} \\ \text{transmission}_{j-1} + \text{floor}(TXTIME(ESPR_j) + \\ x\text{IFS}, a\text{TSFResolution}) + 1, \quad \text{Equation (6)}$$

where Poll_ESPR_space may be the time interval between the end of the last SPR frame transmitted by the non PCP/non AP STA and the expected start time of the first ESPR frame by the non-PCP/non AP enhanced STA.

Figures 13, 14:
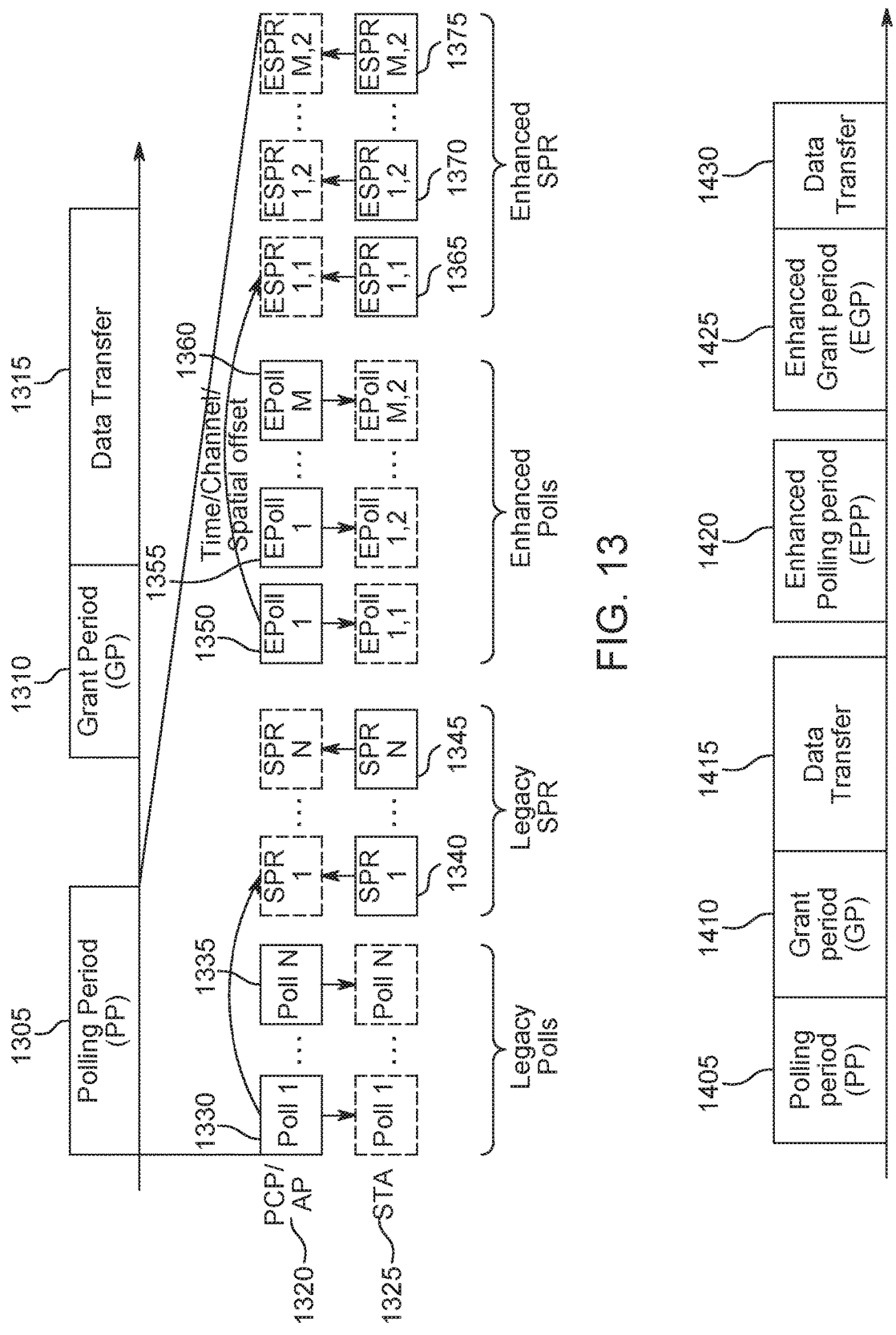
FIG. 13 is a diagram illustrating an example enhanced poll and request procedure where legacy Poll and SPR frames are performed before enhanced poll (EPoll) and enhanced SPR (ESPR) frames.
FIG. 14 is a diagram illustrating an example enhanced poll request procedure where a legacy polling period and grant period is performed before an enhanced polling and grant period.

In an embodiment of backward compatible polling period design, both legacy Poll and legacy SPR frames may be followed by EPoll and ESPR frames. FIG. 13 illustrates an example enhanced poll and request procedure with a PP 1305 where a legacy polling period is followed by an enhanced polling period. As shown in FIG. 13, the legacy polling period (i.e. legacy Poll and SPR frames 1330, 1335, 1340, 1345) of PP 1305 may be performed before an enhanced polling period (i.e. EPoll and ESPR frames 1350, 1355, 1360, 1365, 1370, 1375) of PP 1305. The GP 1310 and data transfer period 1315 may follow the PP 1305. In this example, EPoll frame 1350, 1355, 1360 and ESPR frames 1365, 1370, 1375 may be individually addressed in a frame. In addition, the DL EPoll transmissions and UL ESPR transmissions may use single user (SU) transmissions. However, this may be easily extended for multi user (MU) transmissions. The frame structures and fields for the embodiment illustrated in FIG. 13 may be the same as or similar to those described in FIGS. 10-12.

In the embodiment described in FIG. 13, a Duration field in the Poll, SPR, EPoll, and ESPR frames may be set to cover the entire period. For example, the Duration field within each legacy Poll frame i out of a total of N transmitted legacy Polls and M EPolls may be calculated by the following equation (7):

$$\text{Duration}\_i = \text{Duration\_of\_Poll\_transmission}\_i, N + \text{duration\_of\_EPoll\_transmission} + \text{Offset\_of\_SPR\_transmission}\_N + \text{Offset\_of\_ESPR\_transmission}\_M. \quad \text{Equation (7)}$$

Further, the Duration field within each EPoll frame i out of a total of M EPolls may be calculated by the following equation (8):

$$\text{Duration}\_i = \text{Duration\_of\_EPoll\_transmission}\_i, M + \text{Offset\_of\_ESPR\_transmission}\_M. \quad \text{Equation (8)}$$

And the Duration field within each legacy SPR frame i out of a total of N transmitted legacy SPRs and M ESPR may be calculated by the following equation (9):

$$\text{Duration}\_i = \text{Duration\_of\_SPR\_transmission}\_i, N + \text{Duration\_of\_EPoll\_transmission} + \text{Offset\_of\_ESPR\_transmission}\_M. \quad \text{Equation (9)}$$

The Duration field within each ESPR frame i out of M ESPR may be calculated by the following equation (10):

$$\text{Duration}\_i = \text{Duration\_of\_ESPR\_transmission}\_i, M. \quad \text{Equation (10)}$$

In these equations (7)-(10), the notations may be the same as or similar to the equations (1)-(6) described above.

In another embodiment of backward compatible polling period and grant period design, a legacy polling period (PP) and grant period (GP) may be followed by an enhanced PP and GP. FIG. 14 illustrates an example enhanced poll request procedure where a legacy PP 1405 and legacy GP 1410 followed by legacy data transfer 1414 is performed before an enhanced PP 14120 and enhanced GP 1425 followed by an enhanced data transfer 1430. In this example, EPoll and ESPR frames may be individually addressed in a frame. The enhanced PP 1420 may use SU transmission or MU transmission. In this example, the Duration field in the legacy Poll and Grant frames may be set to cover the legacy PP 1405 and GP 1410, while the Duration field in the enhanced Poll and Grant frames may be set to cover the enhanced PP 1420 and GP 1425. Alternatively or additionally, the Duration field in the legacy Poll/Grant frame and enhanced Poll/Grant frames may be set to cover the entire period. The frame structures and fields for the embodiment illustrated in FIG. 14 may be the same as or similar to those described in FIGS. 10-13.

For all of the procedures described above with respect to FIGS. 10-14, an EMinPPDuration may indicate the minimum duration of the enhanced PP and GP as part of the dynamic allocation and may be specified in microseconds. EMinPPDuration may be equal to or greater than MinPPDuration that may indicate the minimum duration of legacy PP and GP. While associated with a PCP/AP, an enhanced STA may override the value of its local Edot11MinPPDuration variable with the value of this field when it receives this element from its PCP/AP. An enhanced STA may be in the awake state for Edot11MinPPDuration from the start of each SP/CBAP, which may be used for dynamic allocation.

In an embodiment, legacy Poll/SPR frames and EPoll/ESPR frames may be separated in frequency or in the spatial domain. In this embodiment, a PCP/AP may acquire or utilize multiple channels. For example, the legacy Poll frames may be transmitted on the primary channel, and EPoll frames may be transmitted on the rest of the channels. SPR/ESPR frames may be transmitted after the Poll/EPoll frames. SPR frames may be transmitted on the primary channel and ESPR frames may be transmitted on the rest of the channels. The concurrent transmission of legacy Poll and EPoll frames and legacy SPR and ESPR frames may be synchronized.

In another embodiment where legacy poll/SPR and EPoll/ESPR frames are separated in frequency or in the spatial domain, a PCP/AP may use MU-MIMO transmission in the PP (i.e., multiple users may be separated in the spatial domain). The legacy Poll frames may be transmitted over one spatial stream, and EPoll frames may be transmitted on the rest spatial stream(s). SPR/ESPR frames may be transmitted after the Poll/EPoll frames. SPR frames may be transmitted on one spatial stream, and ESPR frames may be transmitted on the rest of the spatial streams. The concurrent transmission of legacy Poll and EPoll frames, and legacy SPR and ESPR frames may be synchronized.

Figure 15:
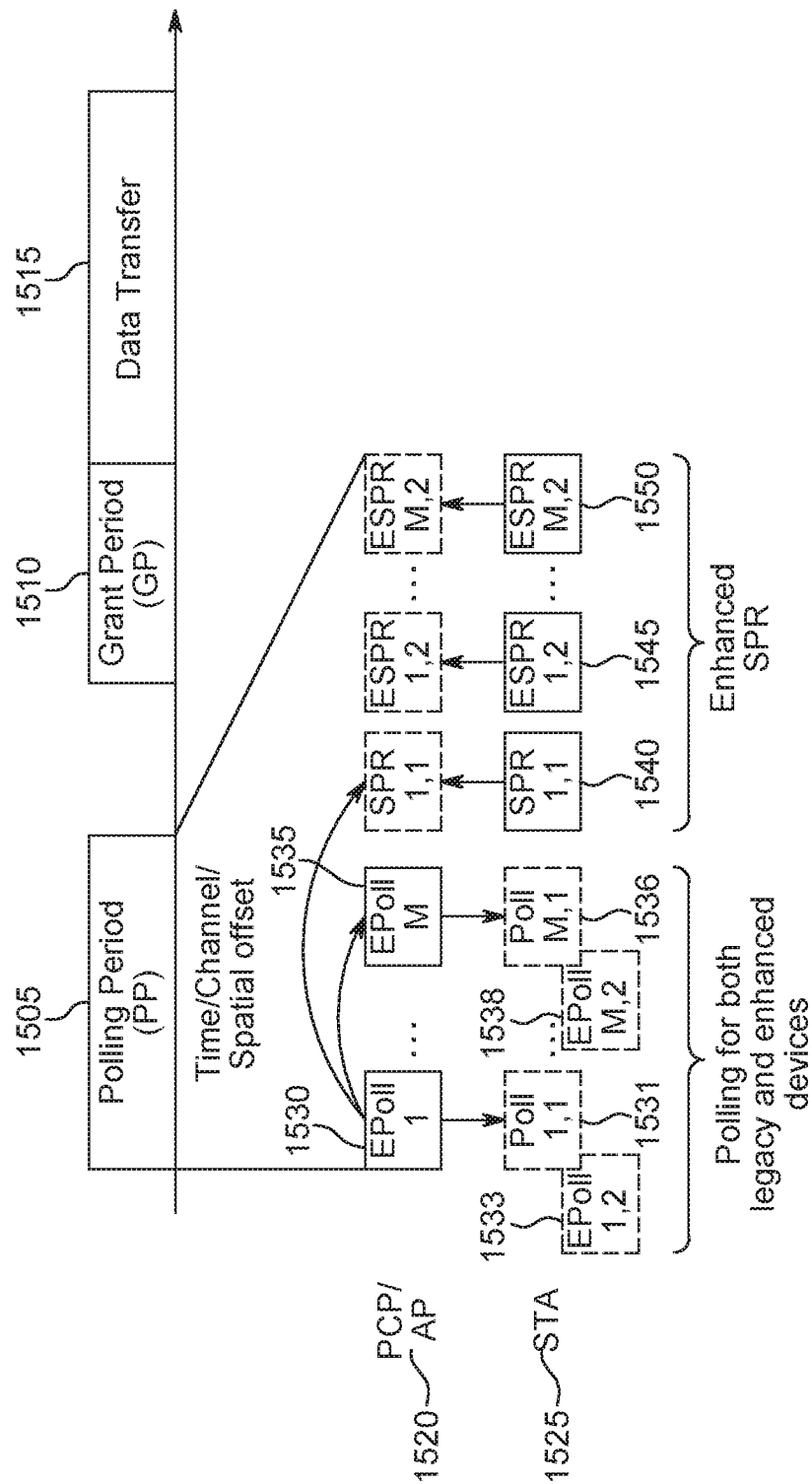
FIG. 15 is a diagram illustrating an example enhanced poll and request procedure with concurrent legacy and enhanced poll transmission.

FIG. 15 illustrates an example enhanced poll and request procedure with concurrent legacy Poll and EPoll transmissions. In one time slot, a legacy Poll frame 1531, 1536 may be transmitted over a primary channel or one spatial stream, while a EPoll frame 1530, 1531, 1535, 1538 may be transmitted over other channels (e.g., secondary channels) and/or other spatial streams. For example, during polling period (PP) 1505, a legacy STA 1525 may receive legacy Poll frames 1531, 1536 over a primary channel, and an enhanced STA 1525 may receive EPoll frames 1530, 1533, 1538 over a secondary channel. In this example, a PCP/AP 1520 may acquire the media by contention or scheduling. The PCP/AP 1520 may start a polling period when certain conditions are met. The polling period may include legacy Poll frames 1531, 1536 and Enhanced Poll frames 1530, 1533, 1535, 1538.

The PCP/AP 1520 may concurrently transmit legacy Poll frames 1531, 1536 to legacy STAs 1525 and enhanced Poll frames 1530, 1533, 1535, 1538 to enhanced STAs 1525 over multiple channels and/or over multiple spatial streams. If MU-MIMO transmission is used, the legacy Poll frame 1531, 1536 may be carried by a legacy PPDU, which may be transmitted over one spatial stream from the beginning of the PPDU. The enhanced Poll frame 1530, 1533, 1535, 1538 may be carried by enhanced PPDUs or legacy PPDUs, which may be transmitted over the rest of the spatial streams. If multi-channel transmission is used, the legacy Poll frame 1531, 1536 may be carried by a legacy PPDU, which may be transmitted over the primary channel. The enhanced Poll frame 1530, 1533, 1535, 1538 may be carried by enhanced PPDUs or legacy PPDUs, which may be transmitted over the rest of channels (e.g. secondary channels). In an embodiment, the enhanced Poll frame 1530, 1533, 1535, 1538 may be carried by enhanced PPDUs or legacy PPDUs, which may be transmitted over the primary channel. The legacy Poll frame 1531, 1536 may be carried by a legacy PPDU, which may be transmitted over the rest of channels (e.g. secondary channels).

Although the legacy Poll frame 1531, 1536 and the EPoll frame 1530, 1533, 1535, 1538 may have a different frame format and a different length, the transmission of the legacy Poll frame 1531, 1536 and the EPoll frame 1530, 1533, 1535, 1538 may be synchronized. In other words, padding may be needed to make the transmissions end at the same time. An xIFS duration after the end of the MU transmission, the PCP/AP 1520 may transmit another set of legacy Poll frames 1531, 1536 and EPoll frames 1530, 1533, 1535, 1538 to another set of STAs 1525.

The EPoll frame 1530, 1533, 1535, 1538 may be individually addressed and may carry a Response Offset field, a Channel Offset field, a Response Antenna Setting, Response Sector Setting and/or Response Polarization Setting field, an ESPR field, or the like. The Response Offset field may indicate the offset in time (e.g., in units of 1 µs). The offset may be the time period between the end of the EPoll frame 1530, 1533, 1535, 1538 and the ESPR frame 1545, 1550 in response to the Poll frame 1531, 1536 to be transmitted. The Channel Offset field may be included in the EPoll frame 1530, 1533, 1535, 1538 and may indicate the channel or channels on which the ESPR frame 1545, 1550 in response to the Poll frame 1531, 1536 may be transmitted. The Response Antenna Setting, Response Sector Setting and/or Response Polarization Setting field may indicate the antenna/sector/polarization setting for the ESPR frame 1545, 1550 in response to the Poll frame 1531, 1536. The ESPR field may indicate whether the expected response frame is an SPR frame 1540 or ESPR frame 1545, 1550.

A STA 1525 that has received a Poll/EPoll frame 1530, 1531, 1533, 1535, 1536, 1538 from the PCP/AP 1520 may transmit an SPR frame 1540 or an ESPR frame 1545, 1550 after the offset duration indicated in corresponding Poll 1531, 1536 or EPoll frame 1530, 1533, 1535, 1538. STAs 1525 polled by a legacy poll frame 1531, 1536 may respond with a legacy SPR frame 1540. STAs 1520 polled by EPoll frame 1530, 1533, 1535, 1538 may respond with either a legacy SPR frame 1540 or an ESPR frame 1545, 1550 depending on the ESPR field indicated in the EPoll frame 1530, 1533, 1535, 1538. If the ESPR field in the EPoll frame 1530, 1533, 1535, 1538 is omitted, the response to an EPoll frame 1530, 1533, 1535, 1538 may be an ESPR frame 1545, 1550.

An SPR frame 1540 may be carried in a legacy PPDU on a primary channel using single stream transmission. An SPR frame 1540 may be transmitted using Quasi-Omni direction or a beamformed direction.

An ESPR frame 1545, 1550 may be fully understood by enhanced devices. The ESPR frame 1545, 1550 may carry a MIMO Control field, a Multi-channel Control field, an MU/SU Control field, an MCS Control field, a Dynamic Allocation Information field, or the like. The MIMO control field may include several subfields and may be used for ESPR frames 1545, 1550 and other control or management frames. If the MIMO Control field is included in an ESPR frame 1545, 1550, the field may carry a MIMO Supported subfield, a Polarization Supported subfield, a Number of Data Streams subfield, a MIMO Training subfield or the like. The MIMO Supported subfield may indicate whether MIMO is supported by the STA 1525. The Polarization Supported subfield may indicate whether polarization is supported. The Number of Data Streams subfield may indicate the suggested number of data streams to be transmitted in the requested allocation. The MIMO Training subfield may indicate whether analog MIMO/BF training and digital MIMO/BF training is ready between the source and destination in the requested allocation.

A Multi-channel Control field may include several subfields and may be used for ESPR frames 1545, 1550 and other control or management frames. If a Multi-channel Control field is included in the ESPR frames 1545, 1550, the field may carry a Channel Aggregation subfield, a Beam per Channel subfield, or the like. The Channel Aggregation subfield may indicate whether channel aggregation or channel bonding is supported, and the Beam per Channel subfield may indicate a number of concurrent beams supported per channel. Alternatively or additionally, this subfield may be included in the MIMO Control subfield.

An MU/SU Control field may indicate whether MU or SU is suggested and/or supported for the requested allocation. An MCS Control field may include several subfields and may be used for ESPR frames 1545, 1550 and other control or management frames. If the MCS Control field is included in the ESPR frames 1545, 1550, the field may carry an MCS subfield, an STBC subfield, a number of spatial streams subfield, a Short/Long LDPC subfield, or the like. The MCS subfield may indicate the suggested MCS level to be used in the requested allocation. The STBC subfield may indicate whether STBC is suggested. The Number of spatial streams subfield may indicate the number of spatial streams suggested for the requested allocation. The Short/Long LDPC subfield may indicate the suggested short or long LDPC codes for the requested allocation.

The dynamic allocation information subfield may be calculated based on the MIMO control and Multi-channel Control field. For example, if two data stream transmissions are requested with aggregation of two channels in the MIMO control and Multi-channel control field, the corresponding allocation duration may take the factor of 4 into account. Alternatively, the Allocation duration field may always be calculated based on a single stream transmission on one channel. In that case, the PCP/AP 1520 may calculate the real duration based on the allocated data stream and channel.

The PPDU that carries an ESPR frame 1545, 1550 may be a legacy PPDU or an enhanced PPDU. The legacy PPDU may be transmitted with a single data stream on a primary channel. The enhanced PPDU may be transmitted with one or more data streams on one or more channels. If multiple channels may be available for the PCP/AP 1520, the transmission of the PPDU may be duplicated on each channel with or without phase rotation. The PPDU may be transmitted using Quasi-Omni direction or a beamformed direction for a single data transmission, which may have been previously trained between the PCP/AP 1520 and the STA 1525.

The fields and subfields described above may be shuffled (i.e., the subfields defined for one field may be included in another field or may be directly included in the ESPR frame 1545, 1550 as a field).

Figure 16:
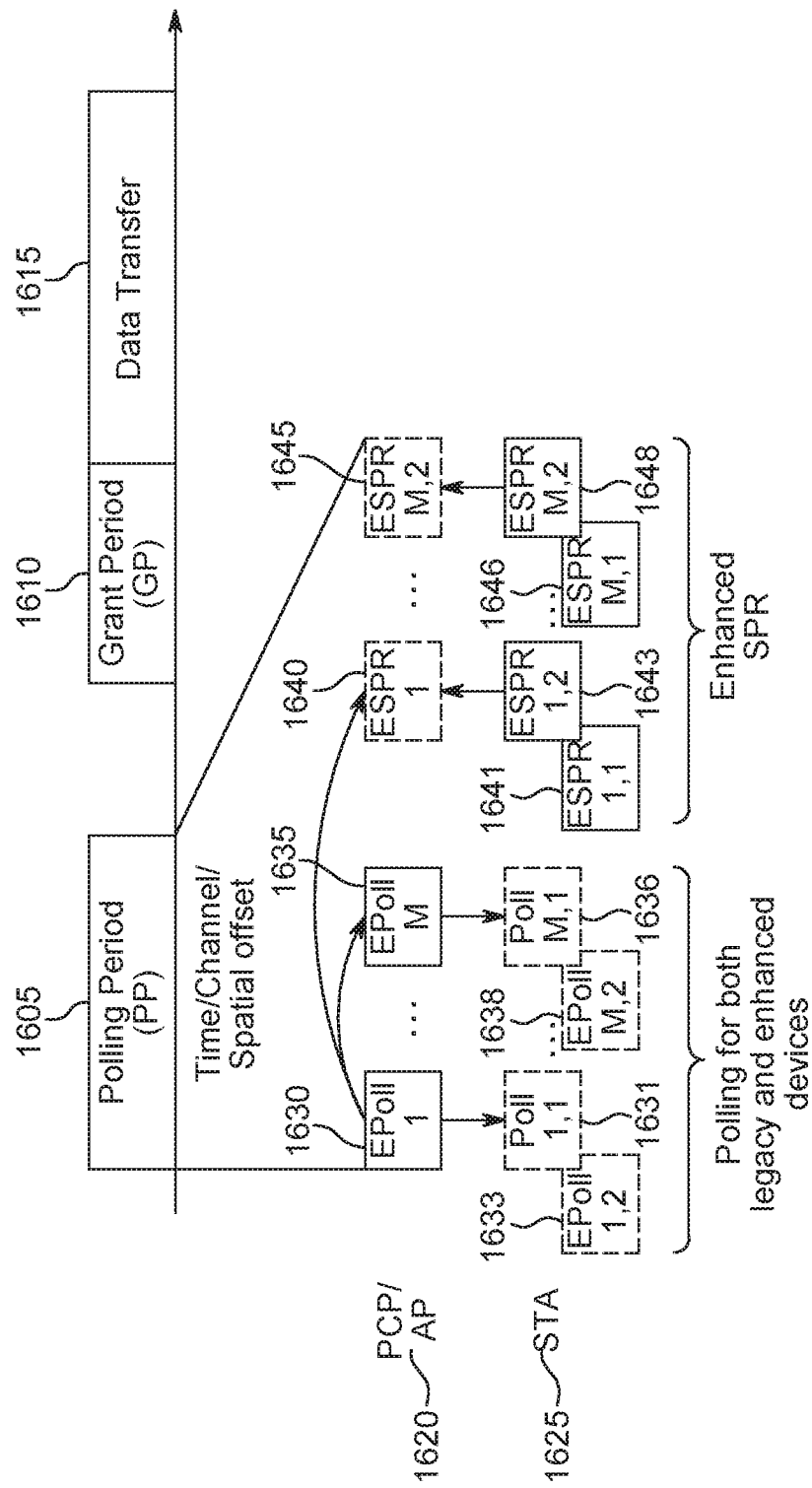
FIG. 16 is a diagram illustrating an example enhanced poll and request procedure with concurrent legacy Poll/SPR and EPoll/ESPR transmissions.

FIG. 16 illustrates an example enhanced poll and request procedure with concurrent legacy Poll/SPR and EPoll/ESPR transmissions. Specifically, legacy Poll/SPR frames 1631, 1636, 1641, 1646 may be transmitted over a primary channel or one spatial stream, while EPoll/ESPR frames 1630, 1633, 1635, 1638, 1640, 1643, 1645, 1648 may be transmitted over other channels and/or other spatial streams. During polling period (PP) 1605, a legacy STA 1625 may receive legacy Poll frames 1631, 1636 over a primary channel, and an enhanced STA 1625 may receive EPoll frames 1630, 1633, 1638 over a secondary channel. The detailed procedure may be similar to that shown in, and described with respect to, FIG. 15. Furthermore, the frame structures and fields for the embodiment illustrated in FIG. 16 may be the same as or similar to those described in FIG. 15.

Figure 17:
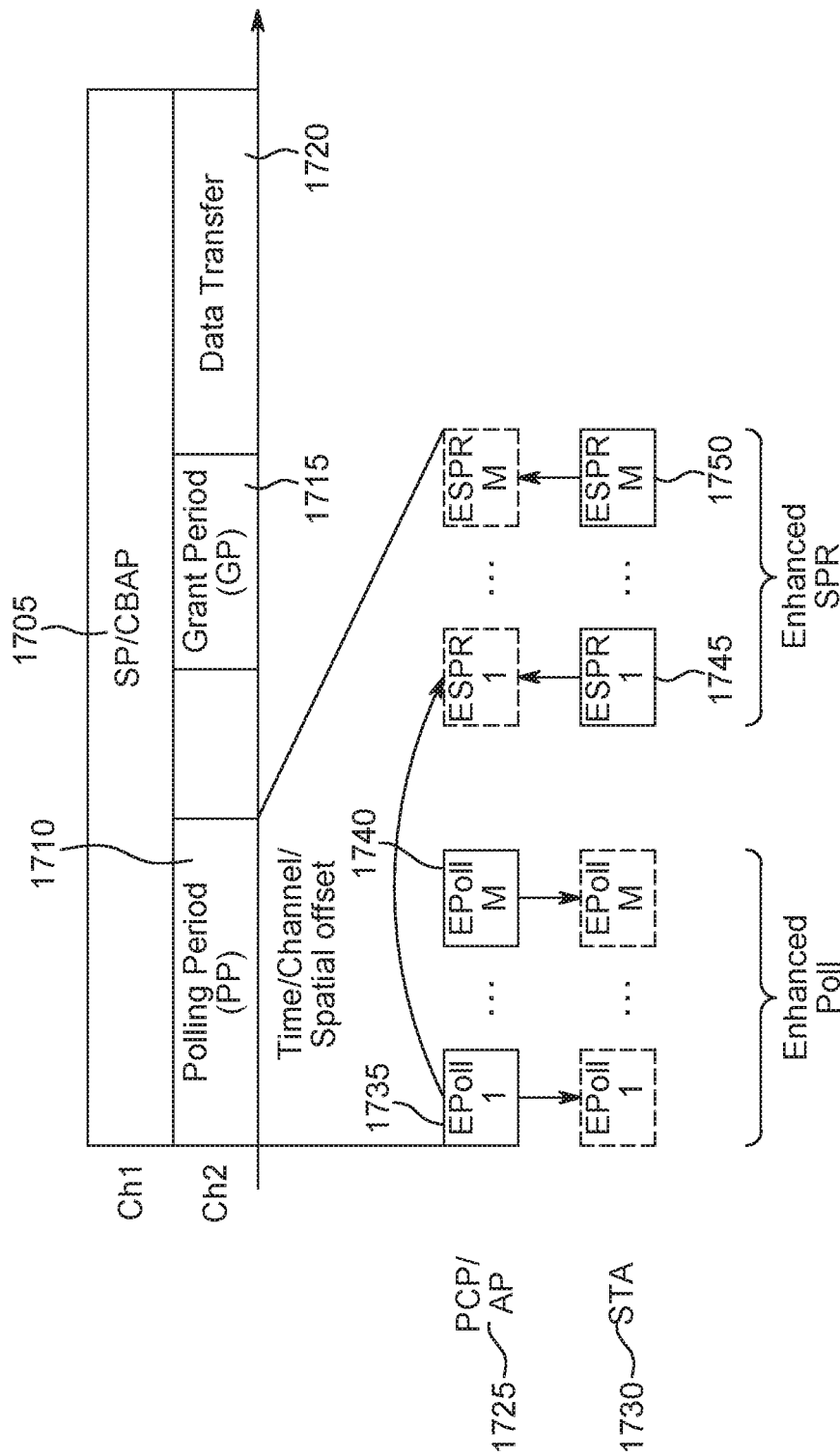
FIG. 17 is a diagram illustrating an example enhanced poll and request procedure with asymmetric channel allocation.

FIG. 17 illustrates an example enhanced poll and request procedure with asymmetric channel allocation. The asymmetric channel allocation may be allowed with multi-channel transmission. For example, the primary channel may be allocated for SP/CBAP 1705 between a pair of STAs (e.g., STA1 and STA2) and the rest of the channels may be used for dynamic allocation.

A PCP/AP 1725 may allocate one or more SPs over multiple channels. The SP on the primary channel may be allocated to STA1 and STA2. The SP on the secondary channel may be broadcast with source and destination AID, and, thus, it may be used for dynamic allocation. Enhanced STAs 1730, besides STA1 and STA2, which may be intended for dynamic allocation, may stay in reception mode on the secondary channel. The PCP/AP 1725 may begin dynamic allocation on the secondary channel. The PCP/AP 1725 may start transmitting EPoll frames 1735, 1740 to the STAs 1730, and the STAs 1730 that have been polled may respond with ESPR frames 1745, 1750. The PCP/AP 1730 may then transmit enhanced Grant (EGrant) frames during Grant Period (GP) 1715 to some STAs 1730, and the data transmission 1720 may follow.

In the example illustrated in FIG. 17, the SP may be allocated to a pair of non-PCT/non-AP STAs on the primary channel. Thus, the PCP/AP 1725 may transmit and receive without restriction on the secondary channel if half duplex radio is assumed at the PCP/AP 1725 side. If duplex radio is assumed at the PCP/AP 1725, the transmission on the primary channel may be between the PCP/AP 1725 and non-PCP/non-AP STAs.

Figure 18:
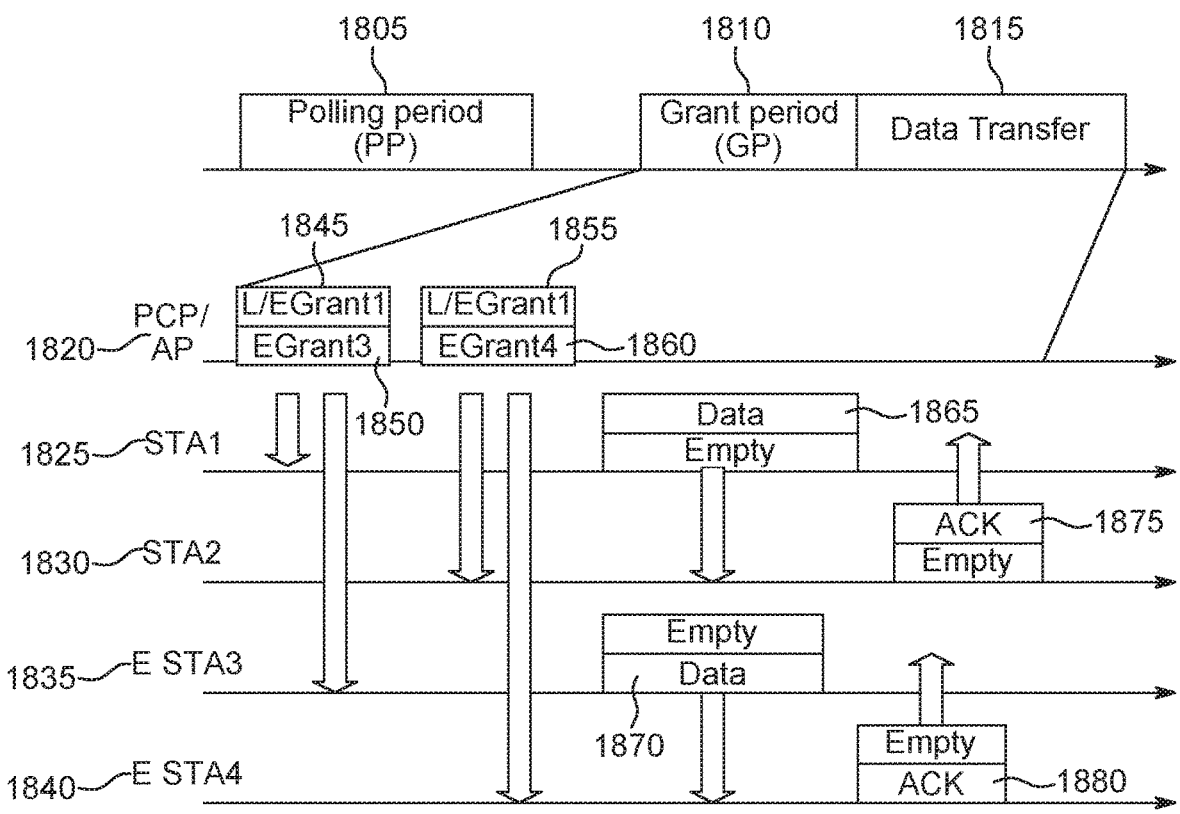
FIG. 18 is a diagram illustrating an example of dynamic service period (SP) allocation on multiple channels.

FIG. 18 illustrates an example of dynamic SP allocation on multiple channels. In this example, a grant period 1810 and data transfer service period 1815 may be enhanced for operation in multiple channels. For example, in a PP 1805, STA1 1825 has indicated in an SPR frame that it wishes to communicate with STA2 1830, and E STA3 1835 has indicated in an SPR frame that it wishes to communicate with E STA4 1840. The E STA3 1835 and E STA4 1840 may be EDMG STAs, and STA1 1825 and STA2 1830 may be DMG or EDMG STAs. In the GP 1810, as shown in FIG. 18, the L/EGrant frames 1845, 1855 and EGrant frames 1850, 1860 may be sent in parallel to STA1 1825 and E STA3 1835, and STA2 1830 and E STA4 1840, on different channels. The STAs 1825, 1830, 1835, 1840 may derive the allocated channel (for data transfer 1865, 1870) implicitly based on the channel in which the grant frame 1845, 1850, 1855, 1860 is received with RA matching its own MAC address. Alternatively or additionally, the allocated channel may be implicitly signaled in an EGrant frame 1850, 1860. In this case, the allocated channel may be the same as, or different from, the channel carrying the EGrant frame 1850, 1860. Furthermore, the EGrant frame 1850, 1860 may allocate multiple channels and may indicate whether channel bonding or aggregation is to be used in the allocation. In the data transfer service period 1815, the STAs 1825, 1830, 1835, 1840 may use the allocated channel and duration to perform data transfer 1865, 1870 and acknowledgement 1875, 1880, as shown in FIG. 18.

In a scheduled SP/CBAP with both the destination and source AID equal to the broadcast AID, or with the CBAP only field being equal to one, the channel access may need to include the primary channel. However, this may not apply to the allocation granted by the EGrant frame 1850, 1860 if dynamic allocation is performed in such SP/CBAP.

The time allocation on different channels may be required to be an equal duration, such that an AP or PCP/AP 1820 may start a subsequent GP 1810 on multiple channels at the same time. It may be required that an EDMG STA 1835, 1840 with an allocation on either the primary or secondary channel pad its transmission until the end of the dynamic allocation to prevent other STAs' access that is not controlled by the AP or PCP/AP 1820.

The AP or PCP/AP 1820 may configure EDMG STAs 1835, 1840 to monitor both primary and secondary channels in certain durations in an SP or CBAP in which a PP 1805 or GP 1810 may occur. This configuration may be done with a setup frame similar to channel bonding wake-up to prepare the STAs 1825, 1830, 1835, 1840 to monitor multiple channels in advance. In the PP 1805, a Poll/SPR frame may be sent on different channels to/from different STAs 1825, 1830, 1835, 1840 in parallel, but the AP or PCP/AP 1820 would need to set the response offset such that proper spacing is maintained between the start of reception of the SPR frame in any channel and the end of transmission of the Poll frame in any other channels.

Alternatively, an EDMG STA 1835, 1840 may only be required to monitor the primary channel in an SP/CBAP in which dynamic allocation may be used. It may switch to operate on both the primary and secondary channels if it receives a Poll frame sent on the primary channel addressed to the EDMG STA 1835, 1840 or a frame sent on the primary channel with an EDMG header-A indicating multi-channel transmission. For the scenario where the Poll frame is sent on the primary channel addressed to the EDMG STA 1835, 1840, the Poll frame may be sent on the primary channel and may be duplicated on secondary channels, while an SPR or ESPR frame from the EDMG STA 1835, 1840 could be sent on a secondary channel. The Poll frame would indicate which secondary channel a STA 1825, 1830, 1835, 1840 should use to respond to the Poll frame. For the scenario where a frame is sent on the primary channel with EDMG header-A indicating multi-channel transmission, the frame may or may not be the Poll frame addressed to the EDMG STA 1835, 1840 but may need to be received by the EDMG STA 1835, 1840. The Poll frame sent to the EDMG STA 1835, 1840 may be received only on a secondary channel. The EDMG STA 1835, 1840 may switch back to monitoring the primary channel if it is not addressed in any received poll frame. In this case, the Poll frame may be transmitted in a Frequency Division Multiple Access (FDMA) PPDU.

It may be required that, at any time when different channels are allocated to different STAs, only one allocation may have a destination AID set to an AP. It may be required that the dynamic allocation with destination AID set to the AP must include the primary channel. For example, if an allocation with an AP as the destination does not include a primary channel, it may be possible that, when the AP is receiving on a secondary channel, the allocation of the primary channel is truncated by either the allocated source or the destination STA on the primary channel. In this case, the AP may not be able to respond to the frames received on the primary channel after the SP truncation, and before the data transfer on the secondary channel are finished.

When grant frames to different STAs are transmitted simultaneously on different channels (e.g., as shown in FIG. 18), the duration of the Grant frame carrying the allocation with an AP as the destination may need to be set to be longer than usual to cover the duration of the Grant frame transmissions on other channels, such that the data transfer to the AP may not start until the Grant process is finished on all channels.

In a scheduled SP/CBAP with both destination and source AID equal to a broadcast AID, or with a CBAP only field being equal to one, the channel access should include a primary channel. This may be required because a STA participating in contention-based access may only be required to perform full clear channel assessment (CCA) and network allocation vector (NAV) procedures on the primary channel.

With the primary and secondary channel being allocated to different STAs in a dynamic allocation, an EDMG STA not participating in the dynamic allocation may perform channel access on both the primary and the secondary channel if: (1) the dynamically allocated SP on the primary channel is truncated; (2) the STA does not hear directional transmissions between the pair of STAs allocated on the primary channel; and/or (3) the STA does not hear from the transmitter on the secondary channel for a PIFS duration. While this may not affect the primary channel (as full CCA and NAV procedures are performed), the receiving STA on the secondary channel may be interfered.

After the Grant frame allocates dynamic SP on the secondary channel and before the data transfer occurs on the primary channel, a short frame exchange may be performed on the primary channel between source and destination STAs allocated on secondary channels, using the antenna configurations for data transfer. The frame exchange may carry duration settings such that EDMG STAs not participating in dynamic allocation may set NAV and not perform channel access for the duration of dynamic SP on the secondary channels. This short frame exchange may be in between a previous GP (which may also allocate the dynamic SP on the secondary channels for the STA pair exchanging short frames) and a later GP allocating the primary channel data transfer. Alternatively, this short frame exchange may be immediately after the GP allocating the SP for all channels (e.g., as illustrated in FIG. 18) but before the data transfer on the primary channel. In this case, the duration of the grant frame sent on the primary channel may need to be set to a longer value to delay the data transfer until after the short frame exchange.

The end time of dynamic SP on secondary channels may be set (via allocation duration) to be smaller than the end time of the dynamic SP on the primary channel. The STA pairs assigned on different secondary channels may perform short frame exchange at the same time on the primary channel, with identical frames carrying the same duration information.

Transmissions between legacy STAs and/or enhanced STAs may be granted by a legacy Grant frame, while transmissions between enhanced STAs may be granted by an enhanced Grant frame (EGrant). An EGrant frame may be used to allocate transmissions over multiple channels or transmissions using MIMO. The EGrant frame may carry necessary information to set up a transmission over MIMO or multiple channels (e.g., analog beam/sector information, beam/sector allocation information, digital precoding schemes, or channel allocation).

Figure 19:
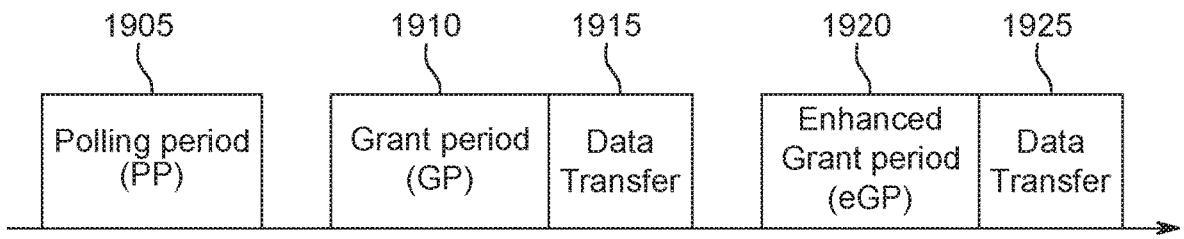
FIG. 19 is a diagram illustrating a first example grant procedure.

FIG. 19 illustrates a first example grant procedure. In this example, a PCP/AP may perform dynamic allocation over an SP or CBAP. The PCP/AP may poll STAs and receive requests from the STAs (this step may be optional) during a PP 1905. Based on the uplink requests that were previously transmitted, the PCP/AP may allocate time resources to STAs. One or more legacy Grant frames may be transmitted during a GP 1910 and legacy data transmission may follow during a data transfer period 1915. Then one or more EGrant frames may be transmitted during eGP 1920 to allocate resources to enhanced STAs. Data transmission may follow in a data transfer period 1925. Here, data transmissions allocated by the eGP 1920 may be legacy data transmissions and/or enhanced data transmissions.

Figure 20:
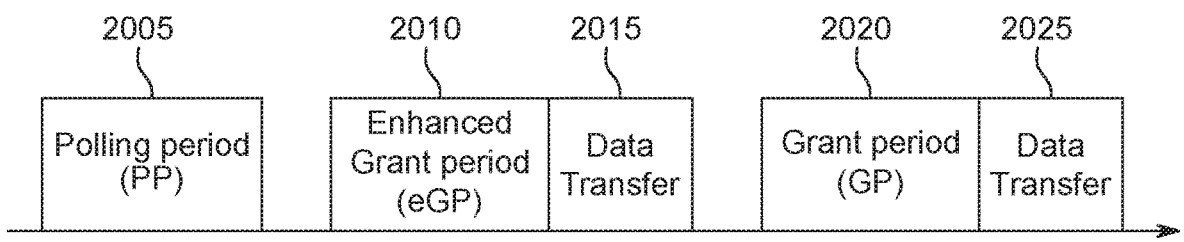
FIG. 20 is a diagram of a second example grant procedure.

FIG. 20 illustrates a second example grant procedure. The procedure illustrated in FIG. 20 is similar to that of FIG. 19 except that, in the second example grant procedure, after a PP 2005, the eGP 2010 and corresponding data transfer period 2015 may be performed before the GP 2020 and corresponding data transfer period 2015.

Figure 21:
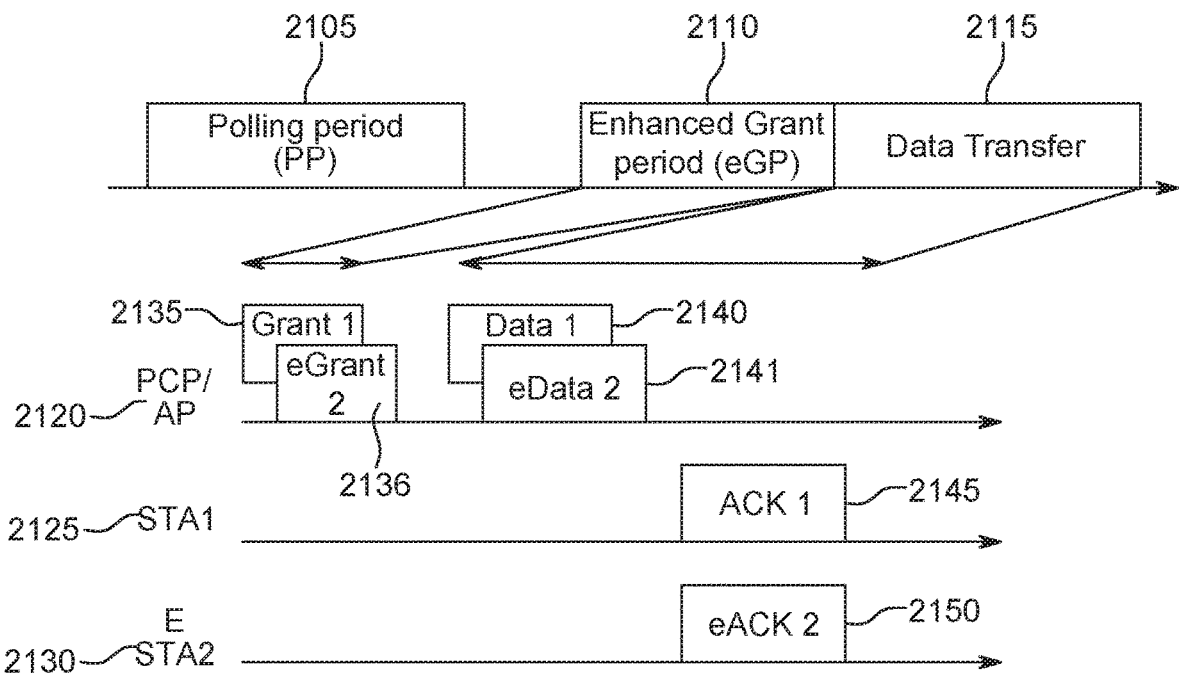
FIG. 21 is a diagram illustrating an example backward compatible transmission within an enhanced grant period (eGP) and a corresponding downlink (DL) data transfer period.

FIG. 21 illustrates an example backward compatible transmission within an eGP 2110 and a corresponding DL data transfer period 2215. In this example, a PCP/AP 2120 may start an eGP 2110 with or without a Poll frame or an EPoll frame having been previously transmitted during a PP 2105. Further, in the eGP 2110, both a legacy Grant frame 2135 and an EGrant frame 2136 may be transmitted concurrently. For example, the Grant frame 2135 and EGrant frame 2136 may be transmitted concurrently over multiple channels. In this case, enhanced devices such as an E STA2 2130 may monitor all the channels and expect to receive an EGrant frame 2136 transmitted over a non-primary channel. Alternatively, the PCP/AP 2120 may transmit an EGrant frame 2136 to an E STA2 2130 on the same channel that the E STA2 2130 previously requested transmission time through Poll/SPR frames or EPoll/ESPR frames. Thus, in either case, an enhanced STA (e.g., E STA2 2130) may monitor the channel on which it previously transmitted SPR frames or ESPR frames. In an embodiment, the Grant frame 2135 and EGrant frame 2136 may be transmitted over multiple streams using MIMO. It should be noted that the aforementioned procedure may be implemented with coexistence of legacy STAs (e.g., STA1 2125) and enhanced STAs (e.g., E STA2 2130). In some embodiments, it may be used to enhanced STAs (e.g., E STA2 2130) by replacing: (1) legacy STAs (e.g., STA1 2125) with enhanced STAs (e.g., E STA2 2130); (2) legacy Grant frames 2135 with EGrant frames 2136; (3) legacy data frames 2140 with enhanced data frames 2141; and (4) legacy ACKs 2145 with enhanced ACKs 2150.

The transmission of Grant frame 2135 and EGrant frame 2136 described above may be aligned. For example, a packet may be padded to make the transmission have equal duration if necessary.

In an embodiment, only an EGrant frame 2136 may be transmitted during the eGP 2110. In this case, the same EGrant frame 2136 that carries information to multiple STAs 2125, 2130 may be repeated over MIMO streams and/or multiple channels. Alternatively or additionally, user specific EGrant frames 2136 may be transmitted over multiple spatial streams and/or multiple channels.

An xIFS duration after the Grant frames 2135 or EGrant frames 2136, a data transmission period (or data transfer period) 2115 may follow. The data transmission 2115 may be composed of legacy data frame (i.e. Data1) 2140 and enhanced data frame (i.e. eData2) 2141 transmissions. The legacy data frame 2140 and enhanced data frame 2141 may be transmitted over MIMO or multiple channels similarly to the transmission for Grant frames 2135 and EGrant frames 2136.

An xIFS duration after data transmissions, the STAs 2125, 2130 may transmit acknowledgement frames (i.e. ACK1 and eACK2) 2145, 2150 back the PCP/AP 2120. In an embodiment, the STAs 2125, 2130 may transmit the acknowledgement frames 2145, 2150 concurrently over MIMO or multiple channels. In another embodiment, the STAs 2125, 2130 may transmit the acknowledgement frames 2145, 2150 using a poll-based scheme. The first poll may be omitted as the DL data transmission may be treated as the first poll.

Figure 22:
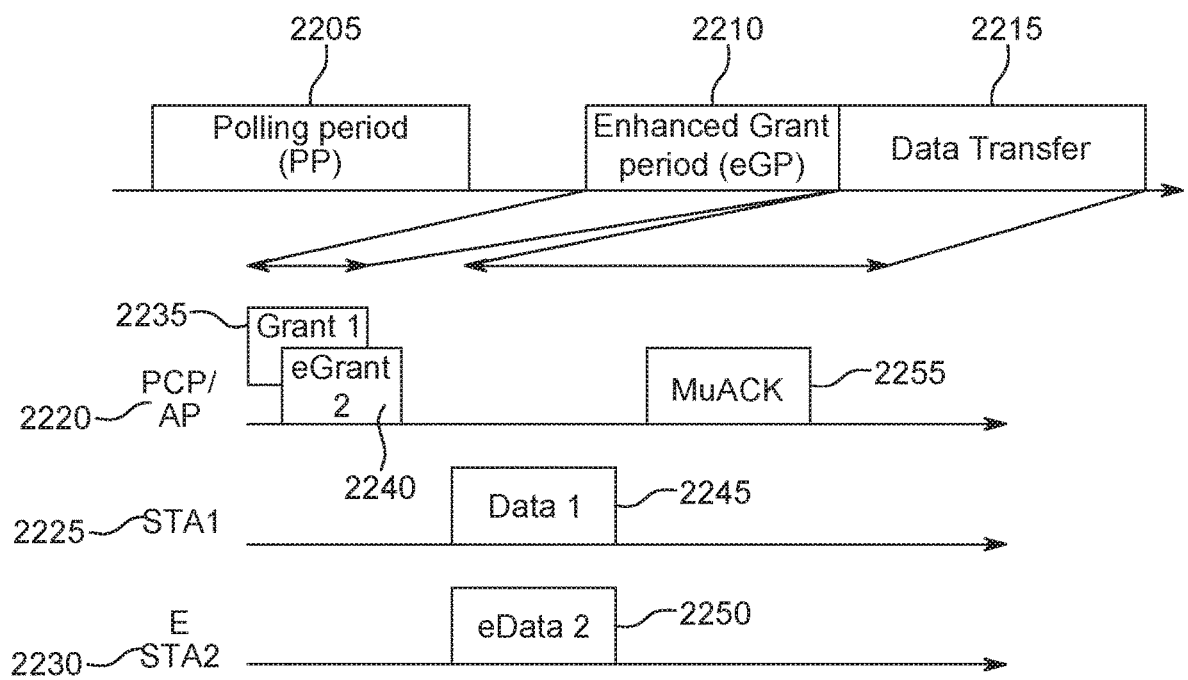
FIG. 22 is a diagram illustrating an example backward compatible transmission within an eGP and a corresponding uplink (UL) data transfer period.

FIG. 22 illustrates an example backward compatible transmission within an eGP 2210 and a corresponding UL data transfer period 2215. The procedure or eGP 2210 may be the same as or similar to the example described in FIG. 21. For example, during eGP 2210, the Grant frame 2235 and EGrant frame 2240 may be transmitted over multiple channels or multiple spatial streams as described above. However, the corresponding data transmission, Data1 2245 and eData 2250, may be a UL multi-user transmission over multiple spatial streams and/or multiple channels. MU ACK 2255 may be transmitted by the PCP/AP 2220 as an acknowledgement for the UL data transmission to STAs 2225, 2230.

Figure 23:
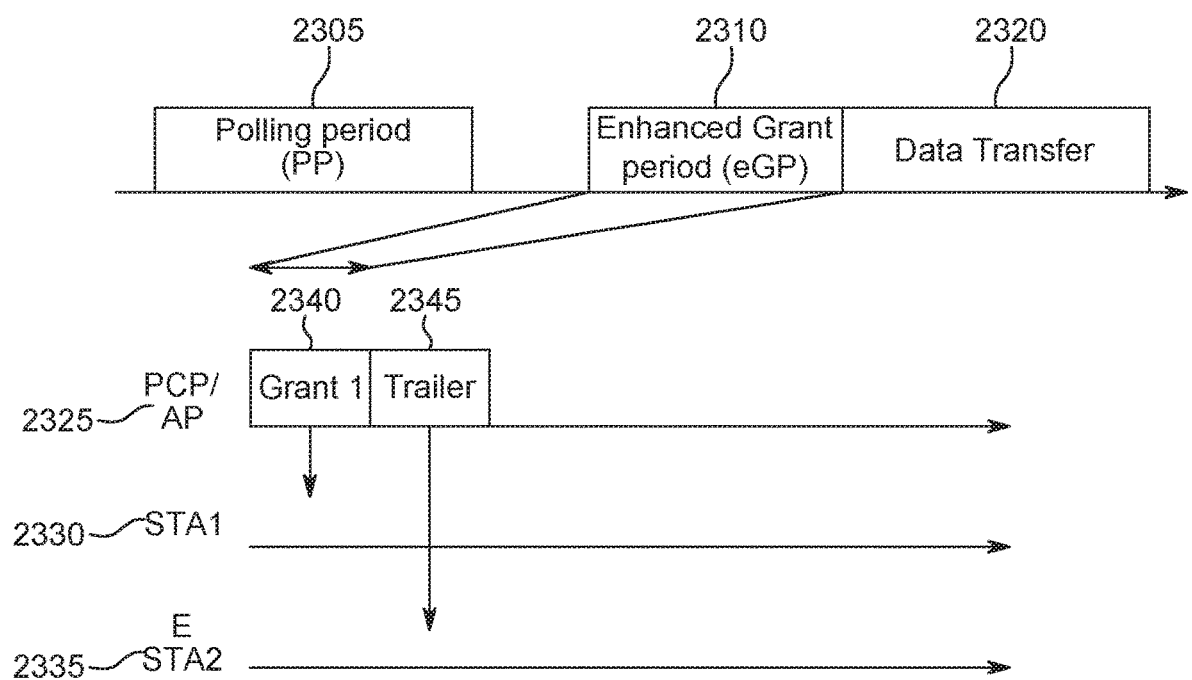
FIG. 23 is a diagram illustrating an example backward compatible transmission within an eGP using a Control Trailer.

FIG. 23 illustrates an example backward compatible transmission within an eGP 2310 using a Control Trailer 2345. In this example, a PCP/AP 2325 may transmit a Grant frame 2340 to multiple STAs 2330, 2335. One of the STAs may be a legacy STA (i.e. STA1) 2330 and the remaining STAs may be enhanced STAs (i.e. E STA2) 2335. The legacy STA 2330 may receive the legacy Grant Frame 2340 and the Control Trailer 2345, but it can only decode the legacy Grant Frame 2340. The enhanced STAs 2335 may also receive the legacy Grant Frame 2340 and the Control Trailer 2345 and may decode both for data transfer period 2320. The legacy Grant frame 2340 may be transmitted in the MAC body while a Control Trailer 2345 may be appended to it. A Control Trailer 2345 may include allocation information and MIMO/Multi-channel setup information for the enhanced STAs 2335. Specifically, the Control Trailer 2345 may include several fields for channel aggregation, bandwidth, channel numbers, SU/MU MIMO, antenna configuration, or the like.

Figure 24:
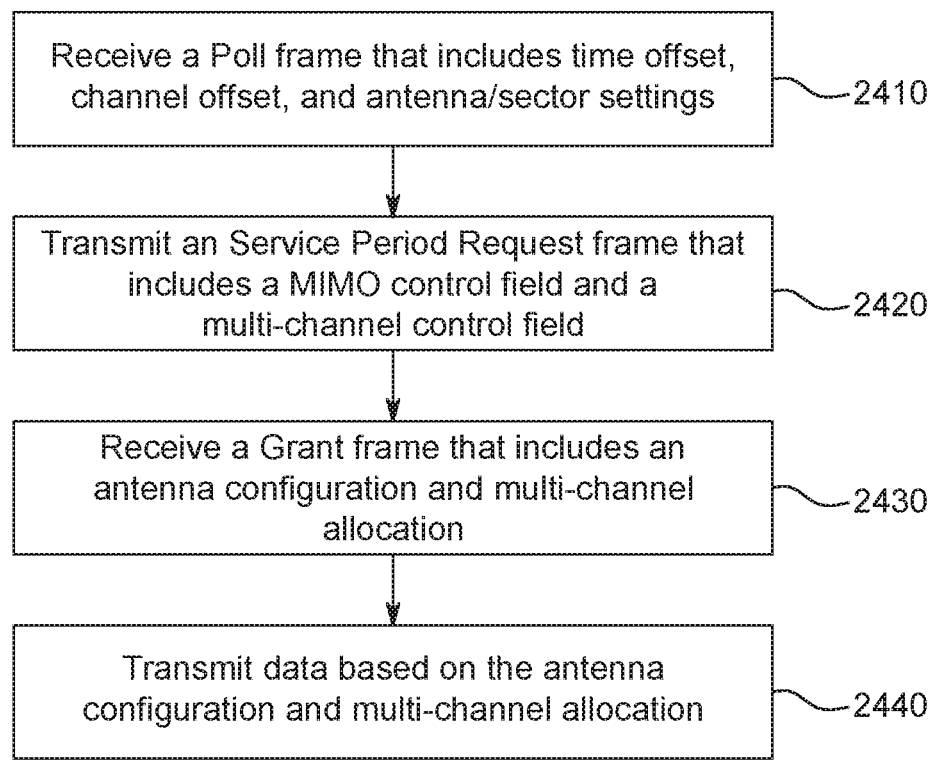
FIG. 24 is a diagram illustrating an example dynamic allocation procedure for MIMO and multi-channel transmission.

FIG. 24 illustrates an example dynamic allocation procedure that enables a STA to perform MIMO and multi-channel transmission. As shown in FIG. 24, at step 2410, a STA may receive, from an access point (AP), a poll frame that includes a time offset, a channel offset, an antenna setting, and a sector setting to enable MIMO and/or multi-channel transmission from the STA. The poll frame may be an enhanced poll frame that includes a response offset field, channel offset field, response antenna setting field, response sector setting field, or the like. The response offset field may include the time offset that indicates the time period between the poll frame and an SPR frame. Specifically, the STA may transmit the SPR frame in response to the poll frame after the time duration indicated in the response offset field. The channel offset field may include the channel offset that indicates a channel or channels on which the SPR frame is transmitted in response to the poll frame. The response antenna setting field may include the antenna setting that indicates antenna configuration on which the SPR frame is transmitted in response to the poll frame. The response sector setting field may include the sector setting that indicates the sector of antenna on which the SPR frame is transmitted.

At step 2420, the STA may transmit a service period request (SPR) frame to the AP based on the poll frame. The SPR frame may be an enhanced SPR frame that includes a MIMO control field, a multi-channel control field, MU/SU control fields, an allocation duration field, or the like. The MIMO control field may include a MIMO supported subfield to indicate whether the STA supports MIMO. The MIMO control field may further include a number of data streams subfield to indicate a suggested number of data streams to be used in the requested allocation. The multi-channel control field may include a channel aggregation subfield to indicate whether the STA supports channel aggregation or channel bonding. The MU/SU control field may indicate whether the STA supports MU or SU for the requested allocation. The allocation duration field may be calculated based on multiple data streams with multi-channels or a single data stream with a single channel. The SPR frame may be carried in a PPDU transmitted with single or multiple data streams based on the channel offset indicated in the poll frame. The PPDU may be transmitted using a Quasi-Omni direction or a beamformed direction based on the antenna and sector settings indicated in the poll frame.

At step 2430, the STA may receive a grant frame from the AP during a grant period. The grant frame may be an enhanced grant frame that includes an antenna configuration and a multi-channel allocation to enable the STA to perform the MIMO transmission and the multi-channel transmission. The grant frame may comprise a legacy grant frame and a control trailer appended to the legacy grant frame. In an embodiment, the grant frame may comprise a PPDU that include a data field and a control trailer inserted after the data field. The antenna configuration and multi-channel allocation for the MIMO and multi-channel transmission may be carried in the control trailer. At step 2440, the STA may transmit data to other STAs or the AP using MIMO and/or multi-channels based on the antenna configuration and multi-channel allocation in the grant frame.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a station (STA), the method comprising:
   receiving, from an access point (AP), a poll frame that indicates a response offset after an end of the poll frame;
   transmitting, in response to the poll frame, based on the response offset, a service period request (SPR) frame that includes a multi-channel control field indicating support for multi-channel transmission; and
   receiving, from the AP, a grant frame that includes a multi-channel allocation to enable the STA to perform a multiple-input and multiple-output (MIMO), multi-channel transmission.

2. The method of claim 1, wherein the SPR frame further includes a MIMO control field indicating support for MIMO transmission, wherein the MIMO control field includes a number of data streams subfield that indicates a number of data streams to be transmitted in the MIMO transmission.

3. The method of claim 1, wherein the multi-channel control field further includes a channel aggregation subfield that indicates support for channel aggregation or channel bonding in the multi-channel transmission.

4. The method of claim 1, wherein the grant frame further includes a multi-user MIMO control field, a single-user MIMO control field, and a dynamic allocation information field.

5. The method of claim 1, wherein the poll frame further comprises channel information, antenna information and sector information.

6. The method of claim 5, wherein the SPR frame is carried in a physical layer (PHY) protocol data unit (PPDU) transmitted with single or multiple data streams based on a channel offset indicated in the channel information.

7. The method of claim 6, wherein the PPDU is transmitted using a Quasi-Omni direction or a beamformed direction based on antenna and sector settings indicated in the antenna information or the sector information.

8. The method of claim 1, wherein the grant frame further comprises a legacy grant frame and a control trailer appended to the legacy grant frame.

9. The method of claim 8, wherein the multi-channel allocation is carried in the control trailer.

10. A station (STA) comprising:
 a processor;
 a receiver; and
 a transmitter,
 the processor and the receiver configured to receive, from an access point (AP), a poll frame that indicates a response offset after an end of the poll frame;
 the processor and the transmitter configured to transmit, in response to the poll frame, based on the response offset, a service period request (SPR) frame that includes a multi-channel control field indicating support for multi-channel transmission; and
 the processor and the receiver configured to receive, from the AP, a grant frame that includes a multi-channel allocation to enable the STA to perform a multiple-input and multiple-output (MIMO), multi-channel transmission.

11. The STA of claim 10, wherein the SPR frame further includes a MIMO control field indicating support for MIMO transmission, wherein the MIMO control field includes a number of data streams subfield that indicates a number of data streams to be transmitted in the MIMO transmission.

12. The STA of claim 10, wherein the multi-channel control field further includes a channel aggregation subfield that indicates support for channel aggregation or channel bonding in the multi-channel transmission.

13. The STA of claim 10, wherein the grant frame further includes a multi-user MIMO control field, a single-user MIMO control field, and a dynamic allocation information field.

14. The STA of claim 10, wherein the poll frame further comprises channel information, antenna information and sector information.

15. The STA of claim 14, wherein the SPR frame is carried in a physical layer (PHY) protocol data unit (PPDU) transmitted with single or multiple data streams based on a channel offset indicated in the channel information.

16. The STA of claim 15, wherein the PPDU is transmitted using a Quasi-Omni direction or a beamformed direction based on antenna and sector settings indicated in the antenna information or the sector information.

17. The STA of claim 10, wherein the grant frame further comprises a legacy grant frame and a control trailer appended to the legacy grant frame.

18. The STA of claim 17, wherein the multi-channel allocation is carried in the control trailer.

19. The STA of claim 10, wherein the response offset is a time period beginning an interframe space after the end of the poll frame.

20. The STA of claim 19, wherein the interframe space is a short interframe space (SIFS).

* * * * *